United States Patent
Zheng et al.

(10) Patent No.: US 12,378,132 B2
(45) Date of Patent: Aug. 5, 2025

(54) LITHIUM TRANSITION METAL OXIDE AND PRECURSOR PARTICULATES AND METHODS

(71) Applicant: NOVONIX BATTERY TECHNOLOGY SOLUTIONS INC., Bedford (CA)

(72) Inventors: Lituo Zheng, Halifax (CA); Mark Obrovac, Halifax (CA)

(73) Assignee: Novonix Battery Technology Solutions Inc., Bedford (CA)

( * ) Notice: Subject to any disclaimer, the term of this patent is extended or adjusted under 35 U.S.C. 154(b) by 831 days.

(21) Appl. No.: 17/638,666

(22) PCT Filed: Aug. 24, 2020

(86) PCT No.: PCT/US2020/047597
§ 371 (c)(1),
(2) Date: Feb. 25, 2022

(87) PCT Pub. No.: WO2021/041296
PCT Pub. Date: Mar. 4, 2021

(65) Prior Publication Data
US 2022/0336805 A1    Oct. 20, 2022

Related U.S. Application Data

(60) Provisional application No. 63/020,526, filed on May 5, 2020, provisional application No. 62/946,938, filed (Continued)

(30) Foreign Application Priority Data

Jul. 24, 2020 (WO) .............. PCT/US2020/043599

(51) Int. Cl.
*C01G 1/02* (2006.01)
*C01G 45/1228* (2025.01)
(Continued)

(52) U.S. Cl.
CPC .......... *C01G 1/02* (2013.01); *C01G 45/1228* (2013.01); *C01G 45/22* (2025.01); *C01G 51/50* (2013.01);
(Continued)

(58) Field of Classification Search
CPC ..................................................... C01G 51/82
See application file for complete search history.

(56) References Cited

U.S. PATENT DOCUMENTS 7,211,237 B2  5/2007  Eberman et al.
7,368,071 B2  5/2008  Dahn et al.
(Continued)

FOREIGN PATENT DOCUMENTS

CN    100497180 C    6/2009
CN    101916843 A   12/2010
(Continued)

OTHER PUBLICATIONS

Office Action received in JP Application No. 2022-509191, dated Apr. 10, 2024 in 4 pages.
(Continued)

*Primary Examiner* — Peter F Godenschwager
(74) *Attorney, Agent, or Firm* — Knobbe, Martens, Olson & Bear, LLP

(57) ABSTRACT

Improved methods for preparing lithium transition metal oxide particulate such as lithium nickel metal cobalt oxide ("NMC") for use in lithium batteries and other applications are disclosed. The lithium transition metal oxide particulate is prepared from appropriate transition metal oxide and Li compound precursors mainly using dry, solid state processes including dry impact milling and heating. Further, novel precursor particulates and novel methods for preparing precursor particles for this and other applications are disclosed.

37 Claims, 29 Drawing Sheets

Related U.S. Application Data on Dec. 11, 2019, provisional application No. 62/893,787, filed on Aug. 29, 2019.

(51) Int. Cl.

| | | |
|---|---|---|
| *C01G 45/22* | (2025.01) | |
| *C01G 51/50* | (2025.01) | |
| *C01G 51/82* | (2025.01) | |
| *C01G 53/44* | (2025.01) | |
| *C01G 53/50* | (2025.01) | |
| *C01G 53/82* | (2025.01) | |
| *H01M 4/505* | (2010.01) | |
| *H01M 4/525* | (2010.01) | |

(52) U.S. Cl.
CPC ............ *C01G 51/82* (2025.01); *C01G 53/44* (2013.01); *C01G 53/50* (2013.01); *C01G 53/82* (2025.01); *H01M 4/505* (2013.01); *H01M 4/525* (2013.01); *C01P 2002/52* (2013.01); *C01P 2002/74* (2013.01); *C01P 2002/77* (2013.01); *C01P 2002/85* (2013.01); *C01P 2004/03* (2013.01); *C01P 2004/32* (2013.01); *C01P 2004/52* (2013.01); *C01P 2004/61* (2013.01); *C01P 2004/62* (2013.01); *C01P 2004/64* (2013.01); *C01P 2006/40* (2013.01)

(56) References Cited

U.S. PATENT DOCUMENTS

| | | | |
|---|---|---|---|
| 7,468,223 | B2 | 12/2008 | Thackeray et al. |
| 7,592,100 | B2 | 9/2009 | Ohzuku et al. |
| 7,682,747 | B2 | 3/2010 | Ohzuku et al. |
| 8,287,772 | B2 | 10/2012 | Le et al. |
| 9,132,482 | B2 | 9/2015 | Maskrot |
| 10,651,467 | B2 | 5/2020 | Von Bulow et al. |
| 11,205,776 | B2 | 12/2021 | Kao et al. |
| 11,316,157 | B1 | 4/2022 | Huang |
| 2007/0160906 | A1 | 7/2007 | Tooyama et al. |
| 2009/0202735 | A1 | 8/2009 | Marlin et al. |
| 2009/0293761 | A1 | 12/2009 | Richardson et al. |
| 2013/0040198 | A1 | 2/2013 | Patoux et al. |
| 2013/0189178 | A1 | 7/2013 | Terayama et al. |
| 2015/0333328 | A1 | 11/2015 | Johnson et al. |
| 2016/0099469 | A1 | 4/2016 | Martin et al. |
| 2017/0050182 | A1 | 2/2017 | Gramiccioni |
| 2017/0133675 | A1 | 5/2017 | Zhu et al. |
| 2017/0309894 | A1 | 10/2017 | Hu et al. |
| 2020/0136141 | A1 | 4/2020 | Han et al. |
| 2021/0359300 | A1 | 11/2021 | Campbell |
| 2022/0298023 | A1 | 9/2022 | Obrovac et al. |
| 2023/0261184 | A1 | 8/2023 | Kim et al. |

FOREIGN PATENT DOCUMENTS

| | | |
|---|---|---|
| CN | 102171865 A | 8/2011 |
| CN | 102239588 A | 11/2011 |
| CN | 102881874 A | 1/2013 |
| CN | 102569780 B | 4/2014 |
| CN | 103855372 A | 6/2014 |
| CN | 104953199 A | 9/2015 |
| CN | 105345012 A | 2/2016 |
| CN | 102683669 B | 3/2016 |
| CN | 105861961 A | 8/2016 |
| CN | 106328887 A | 1/2017 |
| CN | 106531980 A | 3/2017 |
| CN | 106654227 A | 5/2017 |
| CN | 107482172 B | 12/2017 |
| CN | 107785560 A | 3/2018 |
| CN | 107910526 A | 4/2018 |
| CN | 108172826 A | 6/2018 |
| CN | 108172836 A | 6/2018 |
| CN | 109802133 A | 5/2019 |
| CN | 109888207 A | 6/2019 |
| CN | 110336007 A | 10/2019 |
| CN | 110776021 A | 2/2020 |
| CN | 109279659 B | 4/2021 |
| CN | 113782715 A | 12/2021 |
| CN | 114302862 A | 4/2022 |
| CN | 114341061 A | 4/2022 |
| CN | 110581272 | 5/2022 |
| CN | 111661880 B | 8/2022 |
| CN | 115557544 | 1/2023 |
| CN | 116417592 A | 7/2023 |
| CN | 114388758 B | 12/2023 |
| EP | 0390185 B1 | 6/1994 |
| EP | 3307847 A1 | 4/2018 |
| EP | 4095102 A1 | 5/2021 |
| EP | 4021854 | 7/2022 |
| EP | 4021855 A1 | 7/2022 |
| EP | 3154909 B1 | 8/2022 |
| JP | 2001-163700 A | 6/2001 |
| JP | 2005-025975 A | 1/2005 |
| JP | 2005-336004 A | 12/2005 |
| JP | 2007-317585 A | 12/2007 |
| JP | 2008-137837 A | 6/2008 |
| JP | 2012-209242 A | 10/2012 |
| JP | 2015-005376 A | 1/2015 |
| JP | 2016-026981 A | 2/2016 |
| JP | 2018-533166 A | 11/2018 |
| JP | 2022-546264 A | 11/2022 |
| JP | 2022-546934 | 11/2022 |
| KR | 10-2014-0012483 | 2/2014 |
| KR | 10-2022-0054816 | 5/2022 |
| KR | 10-2022-0054822 A | 5/2022 |
| TW | 1565130 B | 1/2017 |
| WO | WO 2012/163660 A1 | 12/2012 |
| WO | WO 2015/183568 A1 | 12/2015 |
| WO | WO 2019/117281 A1 | 6/2019 |
| WO | WO 2019/120973 A1 | 6/2019 |
| WO | 2019/185349 A1 | 10/2019 |
| WO | WO 2021/040931 A1 | 3/2021 |
| WO | WO 2021/040932 A1 | 3/2021 |
| WO | WO 2021/041296 A1 | 3/2021 |
| WO | WO 2021/080384 A1 | 4/2021 |
| WO | WO 2021/123747 A1 | 6/2021 |
| WO | WO 2022/034330 A1 | 2/2022 |
| WO | WO 2022/127324 A1 | 6/2022 |
| WO | WO 2023/102556 A1 | 6/2023 |
| WO | WO 2023/230537 A1 | 11/2023 |
| WO | WO 2024/039915 A1 | 2/2024 |

OTHER PUBLICATIONS

Alonso et al., "Mechanism of the Combined Coating-Mechanofusion Processing of Powders," Powder Technology 59: 45-52 (1989).

Blank et al., "Structural peculiarities of carbon onions, formed by four different methods: Onions and diamonds, alternative products of graphite high-pressure treatment," Scripta Materialia 60: 407-410 (2009).

Chen et al., "Numerical simulation of Mechanofusion system," Powder Technology 146: 121-136 (2004).

Chou et al., "Preparatio of Graphite/Nano-Powder Composite Particles and Applicability as Carbon Anode Material in a Lithium Ion Battery," Advanced Powder Technology 19: 383-396 (2008).

Mechano Fusion Systems AMS Designed for particle-to-particle combination in order to enhance particle performance, KONA, 1999, vol. 17, pp. 244-250.

Naito et al., "Analysis of the Powder Composite Process by a Mechanical Method," KONA 11: 229-234 (1993).

Naito et al., "Applications of Communication Techniques for the Surface Modification of Powder Materials," ISIJ International 33: 916-924 (1993).

Pfeffer et al., "Synthesis of engineered particulates with tailored properties using dry particle coating," Powder Technology 117: 40-67 (2001).

Yokoyama et al., "Ultra-Fine Grinding and Consequent Changes of Powder Characteristics," KONA 1: 53-63 (1983).

(56) References Cited

OTHER PUBLICATIONS

Yoshio et al., "Improvement of natural graphite as a lithium-ion battery anode material, from raw flake to carbon-coated sphere," Journal of Materials Chemistry, 2004, vol. 14, pp. 1754-1758.
International Preliminary Report on Patentability (IPRP) received in PCT Application No. PCT/US2020/043621, dated Mar. 1, 2022 in 11 pages.
International Search Report and Written Opinion received in PCT Application No. PCT/US2020/043621, dated Jan. 14, 2021 in 16 pages.
Written Opinion of International Preliminary Examining Authority received in PCT Application No. PCT/US2023/061842, dated Jul. 7, 2024 in 7 pages.
Office Action received in SA Application No. 522431795, dated May 12, 2023 in 16 pages.
Office Action received in SA Application No. 522431795, dated Nov. 13, 2023 in 8 pages.
Office Action received in Japanese Patent Application No. 2022-510172, dated Jul. 3, 2024 in 14 pages.
Office Action received in SA Application No. 523441363, dated May 14, 2024 in 8 pages.
Delmas et al., "Structural Classification and Properties of the Layered Oxides," Physica, 99B (1980) pp. 81-85.
International Preliminary Report on Patentability received in PCT Application No. PCT/US2020/043599, dated Mar. 1, 2022 in 6 pages.
International Preliminary Report on Patentability received in PCT Application No. PCT/US2020/047597, dated Mar. 1, 2022 in 7 pages.
International Search Report and Written Opinion received in PCT Application No. PCT/US2020/043599, dated Nov. 2, 2020 in 9 pages.
International Search Report and Written Opinion received in PCT Application No. PCT/US2020/047597, dated Dec. 3, 2020 in 11 pages.
Jung et al., "Effect of Ambient Storage on the Degradation of Ni-Rich Positive Electrode Materials (NMC811) for Li-Ion Batteries", Journal of The Electrochemical Society, vol. 165, No. 2, Jan. 1, 2018, pp. A132-A141.
Office Action received in SA Application No. 522431788, dated May 16, 2023 in 16 pages.
Office Action received in CN Application No. 202080060752.0, dated Jun. 29, 2023 in 20 pages.
Son et al., "Structure and electrochemical characterization of $LiNi_{0.3}Co_{0.3}Mn_{0.3}Fe_{0.1}O_2$ cathode for lithium secondary battery", Korean J. Chem. Eng, 2007, vol. 24, Issue 5, pp. 888-891.
Zheng et al., "Tuning of thermal stability in layered Li $(Ni_xMn_yCo_z)O2$," Journal of the American Chemical Society, 2016, 138(4), 13326-13334.
Zybert et al., "Different strategies of introduction of lithium ions into nickel-manganese-cobalt carbonate resulting in $LiNi_{0.6}Mn_{0.2}Co_{0.2}O_2$ (NMC622) cathode material for Li-ion batteries", Solid State Ionics, vol. 348, May 1, 2020, in 10 pages.
Kosova et al., "Mechanochemical synthesis of $LiMn_2O_4$ cathode material for lithium batteries," Solid State Ionics, vol. 135, Nov. 1, 2000, pp. 107-114.
Obrovac et al., "Structure and electrochemistry of $LiMO_2$ (M=Ti, Mn, Fe, Co, Ni) prepared by mechanochemical synthesis," Solid State Ionics, vol. 112, Sep. 2, 1998, pp. 9-19.
Rossen et al., "Structure and electrochemistry of $Li_xMn_yNi_{1-y}O_2$," Solid Sate Ionics, vol. 57, Oct. 1, 1992, pp. 311-318.
Chen et al., "Characteristics of NiO-YSZ anode based on NiO particles synthesized by the precipitation method," Journal of Alloys and Compounds 454: 447-453 (2008).
Chen et al., "Controllable synthesis of Cu-doped CoO hierarchical structure for high perfoamnce lithium-ion battery," Journal of Power Sources 314: 66-75 (2016).
Li et al., "One-step synthesis of Li-doped NiO as high-performance anode material for lithium ion batteries," Ceramics International 42: 14565-14572 (2016).
Thi et al., "High perforamnce of Co-doped NiO nanoparticle anode material for rechargeable lithium ion batteries," Journal of Power Sources 292: 23-30 (2015).
Vallalperuman et al., "Synthesis and characterization of Co and Mn doped NiO nanoparticles," Korean Journal of Chemical Engineering 31: 639-643 (2014).
Zhang et al., "Controlling the Synthesis of CoO Nancrystals with Various Morphologies," J. Phys. Chem. C 112: 5322-5327 (2008).
Zhong et al., "Investigation on porous MnO microsphere anode for lithium ion batteries," Journal of Power Sources 196: 6802-6808 (2011).
Chen et al., "Impact of Initial Li Content on Kinetics and Stabilities of Layered $Li1+x(Ni0.33Mn0.33CO0.33)1-xO2$," Journal of The Electromechanical Society, 159: A1543-A155-(2012).
Kwon et al., "Synthesis and Characterization of Core-Shell Nanocrystals of Co-Riche Cathodes," Journal of the Electrochemical Society 167: 05051 (2019).
Li et al., "Synthesis of Sing Crystal $LiNi0.6Mn0.2Co0.2O2$ with Enhanced Electrochemical Performance for Lithium Ion Batteries," Journal of Electrochemical Society 165: A1038-A1045 (2018).
Pimenta et al., "Synthesis of Li-Rich NMC: A Comprehensive Study," Chemistry of Materials 29: 9923-9936 (2017).
Wang et al., "High performance lithium-manganese-rich cathode material with reduced impurities," Nano Energy 31: 247-257 (2017).
Reddy, ed., "Linden's Handbook of Batteries, 4th edition," pp. 26.5-26.12 (2011).
Office Action received in Chinese Application No. 202080060756.9, dated Oct. 24, 2024 in 15 pages.
Park et al., "The effect of Zn on the microstructure and electrical properties of $Mn1.17-xNi0.93Co0.9znxO4$ ($0<=x,0.075$) NTC thermistors", Journal of Alloys and Compounds, vol. 467, No. 1- 2, Jan. 7, 2009, pp. 310-316.
Zheng et al., "All-Dry Synthesis of Single Crystal NMC Cathode Materials for Li-Ion Batteries", Journal of the Electrochemical Society, vol. 167, No. 13, Oct. 1, 2020 in 8 pages.
International Search Report and Written Opinion received in PCT Application No. PCT/US2023/061842 , dated Jun. 14, 2023 in 13 pages.
International Search Report and Written Opinion received in PCT Application No. PCT/US2023/067437, dated Oct. 9, 2023 in 11 pages.
Second Office Action received in CN Application No. 202080060752.0, dated Feb. 3, 2024 in 25 pages.
Office Action received in SA Application No. 522431788, dated Nov. 8, 2023 in 11 pages.

LITHIUM TRANSITION METAL OXIDE AND PRECURSOR PARTICULATES AND METHODS

CROSS-REFERENCE TO RELATED APPLICATIONS

This application is a 371 national-stage application of International PCT Application No. PCT/US2020/047597, filed Aug. 24, 2020, which claims priority to U.S. Provisional Patent Application No. 62/893,787, filed Aug. 29, 2019; U.S. Provisional Application No. 62/946,938, filed Dec. 11, 2019; U.S. Provisional Application No. 63/020,526, filed May 5, 2020; and International PCT Patent Application No. PCT/US2020/043599, filed Jul. 24, 2020, all of which are incorporated herein by reference in their entirety.

TECHNICAL FIELD

The present invention pertains to novel precursor particulate and improved methods for preparing lithium transition metal oxide particulate therefrom. The lithium transition metal oxide particulate is useful as an electrode material in lithium batteries and other applications.

BACKGROUND

The development of rechargeable high energy density batteries, such as Li-ion batteries, is of great technological importance. Typically, commercial rechargeable Li-ion batteries use a lithium transition metal oxide cathode and a graphite anode. While batteries based on such materials are approaching their theoretical energy density limit, significant research and development continues in order to improve other important characteristics such as cycle life, efficiency, and cost. Further, significant research and development continues in order to simplify the methods of production and to reduce the complexity, material amounts, and losses involved.

Insertion compound transition metal oxide cathode materials for use in lithium rechargeable batteries typically comprise lithium, one or more first row transition metal elements, oxygen, and optional metal dopants (e.g. Mg, Al, Ti, Zr, W, Zn, Mo, K, Na, Si, Ta) and such materials can be further coated with other materials (e.g. $Al_2O_3$, $ZrO_2$, $TiO_2$). For ease of manufacturing, an air stable version of the transition metal oxide is usually employed. Given the substantial demand for these batteries, it is of great importance to be able to provide significant and economic supplies of such materials. At present, lithium nickel manganese cobalt oxide particulate (LiNMC), known as "NMC" commercially, are preferred cathode materials for commercial Li-ion batteries.

"NMC" type materials for use as cathodes in Li-ion batteries generally have an O3 layered structure and have the general actual formula $Li_{1+x}[(Ni_nMn_mCo_c)_{1-a}A_a]_{1-x}O_2$, where $-0.03 \le x \le 0.06$; $n+m+c=1$; $n \ge 0.05$; $m \ge 0$; $c \ge 0$; A is a metal dopant; $0 \le a \le 0.05$; and $m+c+a \ge 0.05$. Especially desirable in some applications are single crystal LiNMC lithium transition metal oxide particulate materials, abbreviated as SC-LiNMC and also known as monolithic "NMC". In some embodiments, SC-LiNMC particles can consist of a single "NMC" grain. In some embodiments, SC-LiNMC particles can consist of multiple "NMC" grains, where the average "NMC" grain facet size is greater than 20% of the average particle size. In some embodiments of SC-LiNMC, the average particle size (D50) is between 1 μm and 30 μm.

A common method of preparing LiNMC (including SC-LiNMC) is to first make a mixed metal hydroxide (MMH) precursor particulate or a mixed metal carbonate (MMC) precursor particulate of Ni, Mn, Co, and optional metal dopant A, each in proportion according to the desired final composition of $Li_{1+x}[(Ni_nMn_mCo_c)_{1-a}A_a]_{1-x}O_2$. The MMH or MMC precursor particulate is made by co-precipitation of metal salts in an aqueous solution, followed by filtering, drying and grinding steps. The resulting MMH or MMC precursor particulate is then ground together with a lithium source (e.g. LiOH, $LiOH \cdot H_2O$ or $Li_2CO_3$), typically in an amount that is in excess of the desired $Li_{1+x}[(Ni_nMn_mCo_c)_{1-a}A_a]_{1-x}O_2$ composition to form a mixture. The mixture is then sintered in air at temperatures in the range of 600-1000° C. A description of the synthesis of LiNMC by this method can be found in Journal of The Electrochemical Society, 165 (5) A1038-A1045 (2018). A two-step heating method can also be employed, as described in WO 2019/185349. The co-precipitation method is commonly used because it produces MMH or MMC precursor particulate that have a particle size larger than 100 nm. Smaller particle sizes create problems with dust and particle handling, making processing more costly. In addition, the co-precipitation method is used because it achieves atomic-scale mixing of the transition metals in the MMH or MMC. This is desirable, since the transition metals can diffuse slowly during sintering, resulting in the formation of unwanted impurity phases in the LiNMC formed after sintering. Therefore, if atomic mixing is not achieved in the MMH or MMC, then long sintering times may be required to convert the MMH or MMC precursor particulates to the desired single-phase LiNMC, which can increase cost. Lithium loss via evaporation also commonly occurs during the sintering step, making long sintering times undesirable. Co-precipitation methods also require many steps and can produce large amounts of waste water. In addition, the co-precipitation method requires that the sources of transition metals are soluble metal salts, which can be more expensive than insoluble sources of these metals, such as metal oxide, hydroxide and carbonate compounds.

An improved method for making "NMC" is described in U.S. Pat. No. 7,211,237, in which cobalt-, manganese-, nickel-, and lithium containing oxides or oxide precursors are wet milled together to form a precursor. The precursor is then heated to produce an "NMC". This method also has the disadvantage of using water, which needs to be removed by drying prior to or during the heating step.

The Journal of The Electrochemical Society, 159 (9) A1543-A1550 (2012) describes a method in which SC—$Li_{1+0.14}(Ni_{0.33} Mn_{0.33} Co_{0.33})_{0.86}O_2$ is made by ball milling $Ni(NO_3)_2 \cdot 4H_2O$, $Mn(NO_3)_2 \cdot 4H_2O$ and $Co(NO_3)_2 \cdot 6H_2O$ together, adding $LiNO_3$ and LiCl, and then heating. In this method the LiCl and KCl components are present to form a molten salt, which requires removal by rinsing after the heating step to obtain the SC LiNMC particles. This method requires many steps and can produce large amounts of waste water.

As stated in Linden's Handbook of Batteries, 4th Edition, McGraw-Hill Education (2010): "NMC and NCA materials rely on a uniform and homogeneous distribution of cations in the transition metal layers of the structure. The most common way to ensure this is to use a mixed transition metal hydroxide or carbonate precursor that has the cations perfectly mixed on the atomic scale." The most common way to synthesize such precursors is by co-precipitation. Solid-state reactions have also been proposed as an economical method to make "NMC" lithium transition metal oxide particulate materials, in which precursors are ground and sintered without the co-precipitation step. However, solid state reactions typically result in inhomogeneous element distribution and low particle size in the lithium transition metal oxide particulate, both of which are detrimental to electrochemical performance. Therefore, solid-state synthesis methods are generally thought to be unsuitable as a practical synthesis method for "NMC". For instance, regarding the solid-state synthesis of "NMC":

Nano Energy, 31 247-257 (2017): "Comparing to coprecipitation process, solid-state synthesis is expected to have a reduced cost, and reduced synthesis time. However, the major disadvantage of the solid-state synthesis is the difficulty in controlling the segregation of transition metal elements in the primary particle level, which in turn has significant impact on the electrochemical performance of the final cathode materials."

Chemistry of Materials, 29 9923-9936 (2017): "Li-rich layered compounds with different morphologies can be prepared via a wide variety of synthesis pathways including solid state, molten salts, hydrothermal, and sol-gel as well as coprecipitation in aqueous medium followed by high temperature synthesis. Among the various possible techniques, solution based coprecipitation (or aqueous sol-gel) is more viable as it can provide atomic level mixing of transition metal ions and hence homogeneity in the final oxide."

In U.S. provisional applications 62/893,787 and 62/946,938 filed on Aug. 29, 2019 and Dec. 11, 2019 respectively, both by the same applicant and both titled "Improved Microgranulation Methods And Product Particles Therefrom", certain NMC precursor particles were disclosed in the examples that had been prepared using an all-solid-state method. The content of these two US provisional applications are incorporated by reference herein in their entirety.

The Journal of The Electrochemical Society, (167) 050501 (2020) describes a method in which acetate transition metal salts were used to prepare a $Ni_{0.25}Mn_{0.25}Co_{0.5}O$ precursor particulate via a colloidal synthetic method. The resulting $Ni_{0.25}Mn_{0.25}Co_{0.5}O$ precursor particulate was nanocrystalline and had a single-phase rock-salt structure. Precursor particulates with a single-phase rock-salt structure are desirable for the synthesis of LiNMC, since they contain transition metals in an atomically mixed solid solution. However, the synthesis described in this reference includes the use of solvents, and the resulting precursor particulate formed by the method consists only of primary particles that had a particle size of only 70 nm, which is not desirable for the production of LiNMC, as discussed above.

U.S. Pat. No. 10,651,467 B2 describes a method in which precursors are synthesized for the preparation of spinel phase Li—Ni—Mn—O. The preparation of the precursor includes ball milling starting materials, followed by heating under a reducing atmosphere. The resulting precursor may include a rock-salt phase. The starting materials include metal oxides, nitrates, sulfates and hydroxides in which the metals have various oxidation states with no limitation or guidance relating to which oxidation states or combination of oxidation states are to be used for the preparation of precursors. The precursors described include multiphase precursors that are not atomically mixed, which, as mentioned above, is detrimental for the formation of single-phase cathode materials. In addition, it is stated that regarding the final precursor: "metallic Ni may be present during the heat treatment in reducing atmosphere."

Despite this continuing and substantial global effort directed at developing improved methods of manufacture of such materials, there remain a need for further improvement.

The present invention addresses these needs and provides further benefits as disclosed below.

SUMMARY

In a first aspect of the invention, precursor particulates that are useful as an ingredient for the synthesis of lithium transition metal oxide particulates and in other applications are described. Specifically, such a precursor particulate is a single phase rock-salt oxide having the formula $(Ni_nMn_mCo_c)_{1-a}A_aLi_bO_{1+b}$, having an average grain size of less than 50 nm, having an average particle size greater than 100 nm, where n, m, c, a, b are positive numbers, A is a metal dopant, and n+m+c=1; n≥0.05; m≥0; c≥0; 0≤a≤0.05; 0≤b≤0.05; and m+c+a≥0.05. Suitable metal dopants, A, include Mg, Al, Ti, Zr, W, Zn, Mo, K, Na, Si, Ta, or combinations thereof.

In some embodiments Mn is included in the composition of the precursor particulate. In some embodiments m is greater than 0.05, in others greater than 0.1, and in others greater than 0.15.

In some embodiments Co is included in the composition of the precursor particulate. In some embodiments c is greater than 0.05, in others greater than 0.1, and in others greater than 0.15.

In some embodiments, both Co and Mn are included in the composition of the precursor particulate. In some embodiments m+c is greater than 0.05, in others greater than 0.1, in others greater than 0.15, in others greater than 0.3.

In some embodiments of the invention, the lattice constant of the rock-salt precursor particulate grains can be greater than 4.18 Å In some embodiments of the invention, the precursor particulate composition includes Ni, and at least one of Mn, Co, A or Li. Ni, Mn, Co, A, and Li are collectively referred to here as precursor metals. In some embodiments of the invention, the precursor metals included in the precursor particulate composition have an overall average oxidation state of 2+. In some embodiments of the invention any precursor metals not having a stable oxidation state of 2+ are incorporated in an amount that is less than 5 atomic % of the total positive ions in the precursor particulate. In some embodiments of the invention, all of the precursor metals incorporated in the precursor particulate have a stable 2+ oxidation state. In some embodiments of the invention, all of constituent precursor metals are in the 2+ oxidation state in the formed precursor particulate.

In some embodiments of the invention, the precursor particulates have a grain size that is less than 50 nm.

In some embodiments of the invention, the precursor particulates have an average particle size that is greater than or equal to 1 µm. In some embodiments, the precursor particulate particles are secondary particles comprised of smaller primary particles.

In some embodiments, the precursor particulates may contain vacancies that occur in the metal lattice or in the oxygen lattice, resulting in a small amount of non-stoichiometry of the rock salt phase. In such cases, the precursor particulate is a single phase rock-salt oxide having the formula $(Ni_nMn_mCo_c)_{1-a}A_aLi_bO_{1+b}$, where n, m, c, a, b are positive numbers, A is a metal dopant, and n+m+c=1; n≥0.05;m≥0;c≥0; 0≤a≤0.05; ≤b≤0.05;m+c+a≥0.05; and −0.02≤δ<0.02.

In a second aspect of the invention, a method is described to produce single-phase rock-salt precursor particulates having the formula $(Ni_nMn_mCo_c)_{1-a}A_aLi_bO_{1+b}$, having an average grain size of less than 50 nm, having an average particle size greater than 100 nm, where n, m, c, a, b are positive numbers, A is a metal dopant, and n+m+c=1; n≥0.05; m≥0 c≥0; 0≤a≤0.05; 0≤b≤0.05; and m+c+a≥0.05; the method comprising obtaining an amount of a compound of Ni, preparing a starting mixture comprising the amount of the compound of Ni, and dry impact milling the starting mixture sufficiently to produce a single-phase rock-salt oxide precursor particulate having an average grain size that is less than 50 nm.

In some embodiments of the invention, the starting mixture may include a compound of Mn, a compound of Co, a compound of A or a compound of Li. Compounds of Ni, Mn, Co, A, and Li are collectively referred to here as metal compounds. In the method, the starting mixture can consist essentially of metal compounds selected from the group consisting of oxides, hydroxides, carbonates and mixtures thereof. In preferred embodiments, more than 50 atomic %, more than 80 atomic % or even more preferably more than 90 atomic % of the precursor metals in the starting mixture are in a 2+ oxidation state. In more preferred embodiments, all the precursor metals in the metal compounds are in their 2+ oxidation state. In preferred embodiments, the average oxidation state of the precursor metals in the starting mixture differs from 2 by an amount no more than 0.5 (i.e. in the range from +1.5 to +2.5), no more than 0.2 or no more than 0.1. Still preferred are those embodiments in which the average oxidation state of the precursor metals in the starting mixture is 2+. In the most preferred embodiments the starting mixture consists only of metal monoxides. Examples of exemplary metal monoxides suitable for use as components of starting mixtures include NiO, MnO, CoO, MgO, TiO, ZnO or their solid solutions. Other examples of metal monoxides suitable for use as components of starting mixtures include CaO, NbO, VO, CrO, and CuO.

In some embodiments of the invention, the ratio of the total number of moles of Ni in the starting mixture to the total number of moles of Mn in the starting mixture to the total number of moles of Co in the starting mixture to the total number of moles of A to the total number of moles of Li in the starting mixture is equal to n:m:c:a:b according to the $(Ni_nMn_mCo_c)_{1-a}A_aLi_bO_{1+b}$ chemical formula of the desired precursor particulate.

To avoid iron contamination, it can be preferred for the dry impact milling to be conducted using non-ferrous milling apparatus. For instance, ball milling using a non-ferrous mill and non-ferrous milling media can be preferred.

As mentioned above, desirable lithium transition metal oxide particulate with an O3 crystal structure and having the formula $Li_{1+x}[(Ni_nMn_mCo_c)_{1-a}A_a]_{1-x}O_2$ with the aforementioned limitations on A, x, m, n, m, c, and a can then be prepared using this novel precursor particulate. An aspect of the invention thus comprises the discovery of improved methods for preparing lithium transition metal oxide particulate, such as lithium nickel metal cobalt oxide ("NMC") for use in lithium batteries and other applications. The methods can especially be used to prepare larger lithium transition metal oxide particulate suitable for such applications, e.g. having an average particle size >1 μm. The lithium transition metal oxide particulate can be prepared from appropriate oxygen containing transition metal compounds and lithium and oxygen containing compound powders solely using dry, solid state processes including dry impact milling and heating.

In some embodiments, the novel precursor particulates are especially suitable for making SC-LiNMC. For instance, in one embodiment, novel precursor particulate prepared by any suitable method is initially obtained. Then, a final mixture comprising an amount of the precursor particulate and an amount of a Li compound selected from the group consisting essentially of Li oxide, Li hydroxide, Li carbonate and mixtures thereof is prepared, and then heated to react the Li compound with the precursor particulate and thereby produce the lithium transition metal oxide particulate with the O3 crystal structure.

In another general embodiment, novel precursor particulate can initially be prepared according to the method described above. In more detail, such methods are for making lithium transition metal oxide particulate with an O3 crystal structure and having the formula $Li_{1+x}[(Ni_nMn_mCo_c)_{1-a}A_a]_{1-x}O_2$ in which A is a metal dopant (e.g. Mg, Al, Ti, Zr, W, Zn, Mo, K, Na, Si, Ta, or combinations thereof), and x, n, m, c and a are numbers in which:

$-0.03 \leq x \leq 0.06$;

$n+m+c=1$;

$n \geq 0.05$;

$m \geq 0$;

$c \geq 0$;

$0 \leq a \leq 0.05$; and $m+c+a \geq 0.05$;

At its most basic, the method comprises the following simple dry process steps of:
preparing a precursor particulate according to the aforementioned method of the invention; preparing a final mixture comprising an amount of the precursor particulate and an amount of a Li compound selected from the group consisting essentially of Li oxide, Li hydroxide, Li carbonate and mixtures thereof; and
heating the final mixture to react the Li compound with the precursor particulate and thereby produce the crystal lithium transition metal oxide particulate with the O3 crystal structure.

Optionally however, additional steps involving liquids may be employed. For instance, if an excess of Li compound is employed in the final mixture, the method can additionally comprise washing away excess unreacted Li compound from the produced lithium transition metal oxide particulate. Additionally, a liquid based coating method could be used to apply a particle coating (e.g. $Al_2O_3$, $ZrO_2$, $TiO_2$) to improve the performance.

In certain embodiments, the starting mixture can consist solely of oxides, hydroxides, carbonates and mixtures thereof. That is, the starting mixture can consist essentially of compounds selected from the group consisting of oxides, hydroxides, carbonates and mixtures thereof.

In the method, the ratio of the total number of moles of Ni in the starting mixture to the total number of moles of Mn in the starting mixture to the total number of moles of Co in the starting mixture to the total number of moles of A in the starting mixture can be equal to n:m:c:a according to the $Li_{1+x}[(Ni_nMn_mCo_c)_{1-a}A_a]_{1-x}O_2$ chemical formula of the desired LiNMC to be synthesized using the precursor particulate. As those skilled in the art will appreciate, the aforementioned numbers n, m, c, a, and b are used to denote variable amounts of metals in a precursor particulate or a lithium transition metal oxide. However, the set of values (n, m, c, a, and b) used in reference to a precursor particulate are not necessarily the same as the set of values (n, m, c, and a) used in reference to a lithium transition metal oxide.

In exemplary embodiments in which "NMC" materials are produced, the method additionally comprises the steps of obtaining an amount of a source of Mn selected from the group consisting essentially of an oxide of Mn, a hydroxide of Mn, a carbonate of Mn, and mixtures thereof, and preparing the starting mixture comprising the amounts of the compound of Ni and the compound of Mn together. In particular, the compound of Ni can be NiO, and the compound of Mn can be MnO.

In exemplary embodiments in which "NMC" materials are produced, the method additionally comprises the steps of obtaining an amount of a source of Co selected from the group consisting essentially of an oxide of Co, a hydroxide of Co, a carbonate of Co, and mixtures thereof, and preparing the starting mixture comprising the amounts of the compound of Ni and the compound of Co together. In particular, the compound of Ni can be NiO, and the compound of Co can be CoO.

In exemplary embodiments in which "NMC" materials are produced, the method additionally comprises the steps of obtaining an amount of a source of Mn selected from the group consisting essentially of an oxide of Mn, a hydroxide of Mn, a carbonate of Mn, and mixtures thereof, obtaining an amount of a source of Co selected from the group consisting essentially of an oxide of Co, a hydroxide of Co, a carbonate of Co, and mixtures thereof, and preparing the starting mixture comprising the amounts of the compound of Ni, the compound of Mn, and the compound of Co together. In particular, the compound of Ni can be NiO, the compound of Mn can be MnO, and the compound of Co can be CoO.

In preparing the lithium transition metal oxide particulate, the Li compound employed can be $Li_2CO_3$, $Li_2O$, $Li_2O2$, LiOH or combinations thereof. Further, the step of heating the final mixture can comprise heating in air. It can be particularly advantageous to obtain certain characteristics in the lithium transition metal oxide particulate however to heat the final mixture in oxygen after heating in air. In exemplary embodiments, the heating step can be conducted at temperatures greater than 600° C., greater than 700° C., greater than 800° C. or greater than 900° C. for sintering times greater than 1 hour, greater than 4 hours, greater than 6 hours, greater than 8 hours or for greater than or about 12 hours. Additional sintering steps with additional Li compound may also be employed.

The method of the invention is particularly suitable for producing larger lithium transition metal oxide particulate, e.g. having an average particle size greater than 1 μm. Further, the lithium transition metal oxide particulate produced can be characterized by an average facet size of greater than 1 μm. Further still, the average facet size of the single crystal lithium transition metal oxide particulate produced can be greater than 20% of the average particle size. And further still, the O3 crystal structure of the lithium transition metal oxide particulate produced can have a c/a ratio of greater than 4.95.

The lithium transition metal oxide particulate made according to the inventive method may be considered for use in numerous commercial applications including as a rechargeable battery electrode component. It can be particularly suitable for use in cathode electrodes in rechargeable lithium batteries, e.g. lithium ion batteries.

DETAILED DESCRIPTION

Figure 1:
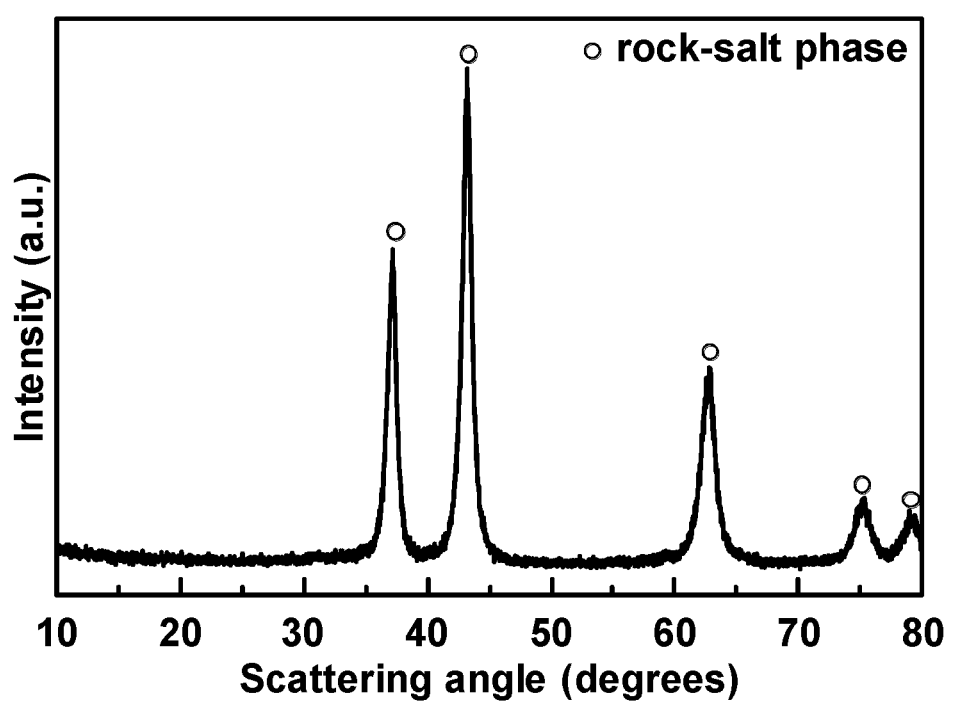
FIG. 1 shows the XRD pattern of NMC622 precursor particulate of inventive Example 1 and referred to as PM1 therein.

Unless the context requires otherwise, throughout this specification and claims, the words "comprise", "comprising" and the like are to be construed in an open, inclusive sense. The words "a", "an", and the like are to be considered as meaning at least one and are not limited to just one.

The phrases "consisting essentially of" or "consists essentially of" are to be interpreted as limiting to the specified materials or steps involved (depending on context) but also to include—and not to exclude—any materials or steps that do not materially affect the basic and novel characteristics of the materials or steps involved.

In a quantitative context, the term "about" should be construed as being in the range up to plus 10% and down to minus 10%.

In addition, the following definitions are to be applied throughout the specification:

"Particulate" refers to a plurality of "particles" in which the "particles" are composed of one or more "grains" (also known in the art as crystallites).

The term "average particle size" refers to the average of the greatest dimension of at least 20 random particles as directly observed by SEM.

The term "average grain size" refers to the average grain size of a phase as determined by the Scherrer grain size determination method.

A "facet" is a plane section of a grain that corresponds to the emergence to the surface of a crystal face with definite Miller indices. The term "average facet size" herein refers to the average of at least 20 random grain facets as directly observed by SEM.

The term "single crystal lithium transition metal oxide particulate" refers to a lithium transition metal oxide particulate material in which its constituent particles are composed of grains having an average facet size that is greater than 20% of the average particle size.

The term "O3" refers to phases having a α-NaFeO$_2$ type structure, as described in C. Delmas, C. Fouassier, and P. Hagenmuller, Physica, 99B (1980) 81-85.

The term "phase" has its conventional general meaning, namely being a distinct and homogeneous form of matter separated at its surface from other forms of matter.

The term "rock-salt phase" refers to an oxide phase having a cubic rock-salt crystal structure that is absent of cation layering order. Such rock-salt phases are also known as "disordered rock-salts".

The term "single-phase rock-salt" or "single rock-salt phase" refers to a material that is phase pure; that is it substantially consists only of matter of the same average composition that is arranged in the same rock-salt phase throughout the material.

"Metal dopant" refers to the group of metals capable of serving as a dopant in a lithium transition metal oxide and includes the metals Mg, Al, Ti, Zr, W, Zn, Mo, K, Na, Si, and Ta, but excludes the metals Ni, Mn, Co, and Li.

The term "dry impact milling" refers to a dry milling process that principally uses repeated impacts upon a sample to result in a grain size reduction and/or a chemical change in the sample. Suitable dry impact milling methods include ball milling, SPEX milling, pebble milling, rod milling, high energy ball milling, attritor milling, Sweco milling, vibratory milling, planetary milling and low energy ball milling as described in U.S. Pat. No. 8,287,772 (Le et al).

The term "metal-ion cell" or "metal-ion battery" refers to alkali metal ion cells, including for instance lithium ion cells.

The term "cathode" refers to the electrode at which reduction occurs when a metal-ion is discharged. In a lithium ion cell, the cathode is the electrode that is lithiated during discharge and delithiated during charge.

The term "anode" refers to the electrode at which oxidation occurs when a metal-ion cell is discharged. In a lithium ion cell, the anode is the electrode that is delithiated during discharge and lithiated during charge.

The term "half-cell" refers to a cell that has a working electrode and a metal counter/reference electrode. A lithium half-cell has a working electrode and a lithium metal counter/reference electrode.

The term "precursor metal" refers to the elements other than oxygen that are incorporated in the precursor particulate composition and includes elements selected from Ni, Mn, Co, A, and Li, where A includes the metal dopants.

The term "primary particle" refers to a particle composed of one domain or multiple domains that are strongly bonded together. Primary particles cannot be easily broken into smaller constituents by dry grinding.

The term "secondary particle" refers to an agglomerate of weakly bound primary particles.

In one aspect of the invention, novel precursor particulates have been developed that are useful as an ingredient for the synthesis of the aforementioned lithium transition metal oxide particulates and for other potential applications.

The precursor particulates are a single-phase rock-salt oxide comprising more than one precursor metal. Such rock-salt phases are known to be in the form of solid solutions in which the constituent metal elements are atomically mixed. This is highly desirable, as having the precursor metals incorporated in a single-phase rock-salt oxide provides atomic mixing of the precursor metals. In addition, the phase purity of the precursor particulates reduces the need for precursor metal diffusion for the formation of single-phase LiNMC during heating of the final mixture. This allows for shorter heating time and lower heating temperatures, reducing cost.

In some embodiments of the invention, the lattice constant of the rock-salt precursor particulate grains can be greater than 4.18 Å, which is the lattice constant of pure rock-salt NiO. While not being bound by theory, a single-phase rock-salt $(Ni_nMn_mCo_c)_{1-a} A_aLi_bO_{1+b}$ phase having lattice constant greater than 4.18 Å is indicative of solid solution formation and therefore atomic-scale mixing of the positive ions in the lattice. This is desirable as it allows a single-phase LiNMC to be more easily formed from the precursor particulate.

In some embodiments of the invention, the precursor particulate has a composition of $(Ni_nMn_mCo_c)_{1-a} A_aLi_bO_{1+b}$, where n, m, c, a, b are positive numbers, A is a metal dopant, and n+m+c=1; n≥0.05; m≥0; c≥0; 0≤a≤0.05; 0≤b≤0.05; and m+c+a≥0.05. Suitable metal dopants, A, include Mg, Al, Ti, Zr, W, Zn, Mo, K, Na, Si, Ta, or combinations thereof. Precursors with this composition are especially suitable in the preparation of lithium transition metal oxide particulate with an O3 crystal structure and having the formula $Li_{1+x}[(Ni_nMn_mCo_c)_{1-a} A_a]_{1-x}O_2$, in which −0.03≤x≤0.06.

In some embodiments of the invention, the inclusion of Mn in the precursor particulate composition is desirable as it is known to increase the thermal stability in the resulting LiNMC made from such precursor particulates. In some embodiments, a value of m greater than 0.05, greater than 0.1, greater than 0.15 or greater than 0.3 is preferred.

In some embodiments of the invention the inclusion of Co in the precursor particulate composition is desirable as it is known to increase lithium diffusion in the resulting LiNMC made from such precursor particulates. In some embodiments a value of c greater than 0.05, greater than 0.1 or greater than 0.15 is preferred.

In some embodiments of the invention, the inclusion of both Mn and Co in the precursor particulate composition is desirable as it is known to increase the thermal stability and improve lithium diffusion in the resulting LiNMC made from such precursor particulates. In some embodiments a value of m+c greater than 0.05, greater than 0.1, greater than 0.15 or greater than 0.3 is preferred.

In some embodiments of the invention, the precursor particulate composition includes a metal dopant, A. Especially desirable are metal dopants, A, having a stable 2+ oxidation state, as these can be more readily incorporated in the single-phase rock-salt precursor particulate without forming secondary phases. Such metal dopants include Mg, Ti, and Zn.

In some embodiments of the invention, the precursor particulate composition includes precursor metals. The inventors have discovered that in making precursor particulate by the ball milling method, the inclusion of significant amounts of transition metals or transition metal compounds in the starting materials that have oxidation states other than 2+ results in either extended milling times to produce a single-phase rock-salt precursor particulate or the inability for a single-phase rock-salt precursor particulate to be produced at all. Therefore, it is one aspect of this invention that the precursor metals included in the precursor particulate composition have an overall average oxidation state of 2+, so that a single-phase rock-salt precursor particulate may be produced. It is further desirable that any precursor metals not having a stable oxidation state of 2+ are incorporated in an amount that is less than 10 atomic % of the total positive ions in the precursor particulate. That is, it is desirable that 90 atomic % or more of the precursor metals included in the precursor particulate composition possess a stable 2+ oxidation state. In other embodiments, it is desirable that 95 atomic % or more of all the precursor metals included in the precursor particulate composition possess a stable 2+ oxidation state. Precursor metals that are known to possess a stable 2+ oxidation sate include Ni, Mn, Co, Mg, Ti, and Zn. Precursor metals that are known not to possess a stable 2+ oxidation state include Li, Al, Zr, K, Na, and Si. It is further desirable that all of the precursor metals incorporated in the precursor particulate have a stable 2+ oxidation state. It is even further desirable that all of constituent precursor metals are in the 2+ oxidation state in the formed precursor particulate. Methods commonly used to determine the oxidation states of metals, such as x-ray photoelectron spectroscopy and ultraviolet photoelectron spectroscopy may be employed to determine precursor metal oxidation state. Other known methods, such as thermogravimetric analysis in oxidizing or reducing atmospheres may also be employed.

In some embodiments of the invention, the precursor particulates have a grain size that is less than 50 nm. While not being bound by theory, it is believed that the small grain size of the precursor particulates allows for fast diffusion of added lithium during the sintering step used to make LiNMC, thus minimizing the sintering time.

In some embodiments of the invention, the precursor particulates have an average particle size that is greater than 100 nm. This is desirable, since it reduces dust, enhances particulate compaction, and enhances particle handling characteristics during manufacturing. In some embodiments the precursor particulate particles are secondary particles comprised of smaller primary particles. In some embodiments, the primary particles have an average size of 100 nm or greater. In some embodiments the precursor particulate particles have an average size of 1 μm, 5 μm, 10 μm, or even 20 μm. Without being bound by theory, it is believed that precursor particulate that comprises secondary particles made from aggregates of primary particles improves powder handling characteristics compared to if the primary particles were not aggregated by improving particle flow, increasing particle tap density, and reducing dust generation. It is further believed that precursor particulate that comprises secondary particles made from aggregates of primary particles reduces heating time for the formation of SC-LiNMC, compared to if the primary particles were not aggregated.

In a second aspect of the invention, a method is described to produce single-phase rock-salt precursor particulates having the formula $(Ni_nMn_mCo_c)_{1-a} A_aLi_bO_{1+b}$, having an average grain size of less than 50 nm, having an average particle size greater than 100 nm, where n, m, c, a, b are positive numbers, A is a metal dopant, and n+m+c=1; n≥0.05; m≥0; c≥0; 0≤a 0.05; 0≤b0.05; and m+c+a≥0.05; the method comprising obtaining an amount of a compound of Ni, preparing a starting mixture comprising the amount of the compound of Ni, and dry impact milling the starting mixture sufficiently to produce a single-phase rock-salt oxide precursor particulate having an average grain size that is less than 50 nm. In the method, the starting mixture can consist essentially of compounds selected from the group consisting of oxides, hydroxides, carbonates and mixtures thereof. Further, in the method, the ratio of the total number of moles of Ni in the starting mixture to the total number of moles of Mn in the starting mixture to the total number of moles of Co in the starting mixture to the total number of moles of A to the total number of moles of Li in the starting mixture is equal to n:m:c:a:b. The dry, solid state processes employed in the disclosed method to prepare a single-phase rock-salt precursor particulate are advantageous compared to certain precursor particulates in the form of lithium transition metal hydroxide or carbonates that require more complex, liquid processing steps (e.g. steps requiring large amounts of water).

In some embodiments of the invention, the starting mixture may include a compound of Mn, a compound of Co, a compound of A or a compound of Li. Compounds of Ni, Mn, Co, A, and Li are collectively referred to here as metal compounds. In the method, the starting mixture can consist essentially of metal compounds selected from the group consisting of oxides, hydroxides, carbonates and mixtures thereof. In preferred embodiments, no more than 50 atomic %, no more than 20 atomic % or even more preferably no more than 10 atomic percent of the precursor metals in the starting mixture are in an oxidation state other than 2+. In more preferred embodiments, all the precursor metals in the metal compounds are in their 2+ oxidation state. In preferred embodiments, the average oxidation state of the precursor metals in the starting mixture differs from 2 by an amount no more than 0.5, no more than 0.2 or no more than 0.1. Still preferred are those embodiments in which the average oxidation state of the precursor metals in the starting mixture is 2. In the most preferred embodiments the starting mixture consists of only metal monoxides. Examples of exemplary metal monoxides suitable for use as components of starting mixtures include NiO, MnO, CoO, MgO, TiO, ZnO or their solid solutions. It has been found by the inventors that starting mixtures consisting only of metal monoxides can easily form a single phase rock-salt oxide during ball milling, while the inclusion of metal oxides or other metal compounds especially with precursor metals not in the 2+ oxidation state either results in a significantly longer milling time to form a single phase rock-salt oxide precursor particulate or often results in multiple phases being formed. It is envisioned that the metal compounds may be formed with the precursor metals in their desired +2 oxidation state in-situ during the milling process. For instance, milling a mixture that includes Mn metal and $Co_3O_4$ in proper combination could result in the formation of the starting mixture components MnO and CoO or a solid solution of these oxides. In another instance, milling a mixture that includes $MnO_2$ with a suitable amount of carbon powder could result in the formation of the starting mixture component MnO.

Any of various known dry impact mechanical milling techniques may be employed in preparing the novel single-phase rock-salt precursor particulates, including ball milling or jar milling (as in the Examples following), SPEX milling, hammer milling, planetary milling, vibratory milling, and so on. Importantly, the dry impact milling is performed to a sufficient extent so as to produce essentially single phase rock-salt precursor particulate comprising grains in which the average grain size is less than 50 nm. The inventors have found that non-impact milling techniques, such as hand grinding, or other techniques known to reduce particle size, but not grain size, are not suitable for this method as they do not cause mixing at the atomic scale and often result in the formation of multiphase mixtures.

As disclosed earlier, desirable lithium transition metal oxide particulate with an $O_3$ crystal structure and having the aforementioned formula $Li_{1+x}[(Ni_nMn_mCo_c)_{1-a} A_a]_{1-x}O_2$ can be prepared using this novel precursor particulate. For instance, in one embodiment, novel precursor particulate can initially be prepared according to the method described above. Then, a final mixture comprising an amount of the precursor particulate and an amount of a Li compound selected from the group consisting essentially of Li oxide, Li hydroxide, Li carbonate and mixtures thereof is prepared, and then heated to react the Li compound with the precursor particulate and thereby produce the lithium transition metal oxide particulate with the O3 crystal structure. In another general embodiment, novel precursor particulate prepared by any suitable method is initially obtained. Then, a final mixture comprising an amount of the precursor particulate and an amount of a Li compound selected from the group consisting essentially of Li oxide, Li hydroxide, Li carbonate and mixtures thereof is prepared. In some embodiments, the amounts of each may be chosen based on the final desired stoichiometry of the lithium transition metal oxide particulate. In other embodiments, it may be preferred to use an excess of the Li compound. The final mixture is then heated to react the Li compound with the precursor particulate and thereby produce the lithium transition metal oxide particulate with the O3 crystal structure. An additional step (e.g. a water washing step) may be utilized to remove excess unreacted Li compound from the desired lithium transition metal oxide particulate. Further additional processing steps may be employed to apply surface coatings (e.g. $Al_2O_3$ or $TiO_2$) to the surface of the lithium transition metal oxide particulate particles.

Relevant lithium transition metal oxide particulate includes single phase, lithium transition metal oxide particulate with an O3 crystal structure. Such materials are characterized with low cation mixing (i.e. no transition metal in the lithium layer) and are desirable for good kinetics and low irreversible capacity for use in rechargeable lithium batteries.

Relevant lithium transition metal oxide particulate having the O3 structure is further characterized by the chemical formula $Li_{1+x}[(Ni_nMn_mCo_c)_{1-a} A_a]_{1-x}O_2$ in which A is a metal dopant, and x, n, m, c and a are numbers in which $-0.03 \leq x \leq 0.06$;

$n+m+c=1$;

$n \geq 0.05$;

$m \geq 0$;

$c \geq 0$;

$0 \leq a \leq 0.05$; and $m+c+a \geq 0.05$;

Thus, relevant lithium transition metal oxide particulate includes the transition metal Ni and may further include the transition metals Mn and Co. Further, the optional metal dopant A can be any of those commonly considered for use with such materials, including but not limited to Mg, Al, Ti, Zr, W, Zn, Mo, K, Na, Si, Ta or combinations thereof.

In particular, the method can be used to prepare single crystal lithium nickel metal cobalt oxide lithium transition metal oxide particulate or SC-LiNMC, which is a preferred electrode material for use in lithium rechargeable batteries and other applications. SC-LiNMC is desirable in such applications in part because of its excellent lithiation/delithiation kinetics.

In prior art techniques, co-precipitation was conventionally used to initially prepare hydroxide or carbonate precursors which were then subsequently heated to produce SC-LiNMC. This is because the slow diffusion of the transition metals requires them to be intimately mixed, so that they can form single-phase materials when heated. It was also thought that the size of the precursor governs the size of SC-LiNMC.

We have found that single-phase rock-salt precursor particulate is suitable for forming SC-LiNMC during heating with a Li compound. Further, the size of the SC-LiNMC thus formed is not related to the size of the precursor particulate. Instead, without being bound by theory, it is believed that the particle size of the SC-LiNMC is determined by the heating time in air of the final mixture. For instance, it has been found that heating in air promotes grain growth, while heating in oxygen promotes more perfect ion ordering in the lithium transition metal oxide O3 structure. However, heating in oxygen only results in smaller grains. Therefore, in some embodiments, it can be desirable to first heat the final mixture in air for a time necessary to obtain the desired grain size and then heat the resulting material in oxygen to obtain more perfect ion ordering. As a result of such a two-step heating method, SC-LiNMC with large facets and good O3 ordering may be obtained. Nevertheless, if the particle size of the precursor particulate is smaller than 100 nm, its processing becomes difficult because of poor precursor particulate particle flow, low precursor particulate particle tap density, and the ease for the creation of dust. Furthermore, without being bound by theory, as the precursor particulate particle size becomes small, the heating time required to form SC-LiNMC particles of a practical size becomes large, increasing processing cost. Therefore it is desirable that the precursor particulate particle size be greater than 100 nm.

It has also been found that sufficient dry impact milling can result in the milled precursors forming a precursor particulate consisting essentially of a single rock-salt phase having a grain size less than 50 nm. Without being bound by theory, it is believed that a single rock-salt phase formation is indicative of atomic-scale mixing and that such precursor particulate can have superior lithium transition metal oxide particulate forming ability during heating because of the resulting shortened diffusion lengths. The lattice constant of rock-salt phase grains produced in this way can be greater than 4.18 Å.

Using the method of the invention, lithium transition metal oxide particulate can be produced with an average particle size greater than 1 μm and less than 40 μm, and comprising facets in which the average facet size is >1 μm, more preferably >4 μm, and even more even preferably >8 μm. The average facet size of the lithium transition metal oxide particulate may be greater than 20%, greater than 30%, greater than 50%, greater than 60% or even greater than 70% of the lithium transition metal oxide particulate average particle size. The average particle size of the lithium transition metal oxide particulate may be greater than 1 μm, greater than 5 μm, greater than 7 μm or even greater than 9 μm. The c/a ratio of the crystal structure (as obtained via XRD), which is indicative of $O_3$ ordering, can preferably be greater than 4.95, and more preferably greater than 4.96. Further a pronounced Cu $K_{\alpha 1}/K_{\alpha 2}$ splitting of the (104) peak can be obtained, which is another indication of good ordering in the O3 structure.

It has further been found that in preparing the precursor particulate, dry impact milling using non-ferrous mills and milling media can avoid iron contamination in the lithium transition metal oxide particulate prepared from the precursor particulate and thereby improve the quality of lithium transition metal oxide particulate produced for battery applications by this method. This is because Fe is known to migrate into the Li layer during battery cycling, resulting in increased polarization and capacity fade in such batteries. Thus, in some embodiments the use of iron-free materials in the milling apparatus is desirable.

As those skilled in the art will appreciate, appropriate operating parameters for the dry impact milling and heating processes required to obtain good lithium transition metal oxide particulate can be expected to vary according to the type and size of precursors employed, the milling technique and apparatus employed, and the like. It is expected that those of ordinary skill will readily be able to determine appropriate operating parameters for a given situation based on guidance provided in the Examples below.

Once prepared as in the preceding manner, the lithium transition metal oxide particulate is generally ready for conventional use in its intended application. In battery applications, electrodes and electrochemical devices employing lithium transition metal oxide particulate may be prepared in numerous manners known to those in the art. For instance, there are numerous optional designs and methods for making cathode electrodes for rechargeable lithium ion batteries as well as for making the batteries themselves and these have been documented extensively in the art.

The following examples are illustrative of certain aspects of the invention but should not be construed as limiting the invention in any way. Those skilled in the art will readily appreciate that other variants are possible for the methods used and materials produced herein.

EXAMPLES

Exemplary lithium transition metal oxide and precursor particulates were prepared using the dry processing methods in accordance with the invention. Other lithium transition metal oxide and precursor particulates were also prepared for comparison purposes. Various characteristics of these particulates were determined and presented below. In addition, electrodes and electrochemical cells were prepared using some of these lithium transition metal oxide particulates. The cell performance results obtained from the electrochemical cells are also presented below.

Material Characterization

Specific surface area was determined by the single-point Brunauer-Emmett-Teller (BET) method using a Micromeritics Flowsorb 112300 surface area analyzer.

X-ray diffraction (XRD) patterns were collected using a Rigaku Ultima IV diffractometer equipped with a Cu Kα X-ray source, a diffracted beam graphite monochromator and a scintillation detector. Average grain size was determined from XRD patterns using the Scherrer grain size determination method.

Scanning electron microscope (SEM) images were obtained using a JEOL 840-SEM. Energy dispersive x-ray spectroscopy (EDS) mapping images were obtained using a MIRA-3 TESCAN variable pressure Schottky Field Emission Scanning Electron Microscope or FESEM.

Average facet size was determined as the average of at least 20 random grain facets as directly observed by SEM.

Average particle size was determined as the average of the greatest dimension of at least 20 random particles as directly observed by SEM.

Electrode Preparation

Sample electrodes for laboratory testing were prepared from slurries prepared by mixing the prepared lithium transition metal oxide particulate, carbon black (Super C65, Imerys Graphite and Carbon), and polyvinylidene fluoride binder (PVDF, Kynar HSV 900) ) in an active particle/carbon black/PVDF mass ratio of 92/4/4 with an appropriate amount of N-methyl-2-pyrrolidone (NMP, Sigma Aldrich, anhydrous 99.5%). Slurries were mixed for 10 minutes using a high-shear mixer and then spread onto aluminum foil with a 0.006 inch gap coating bar. The coatings were then dried in air for 90 minutes at 120° C., cut into 1.3 cm disks and then heated under vacuum for at least 12 hours at 120° C. with no further air exposure before assembling the cells.

Cell Preparation

To evaluate the various materials as electrode materials in Li-ion cells, laboratory test lithium half-cells were constructed and tested. Electrodes were assembled in 2325-type coin lithium half-cells with a lithium foil (99.9%, Sigma Aldrich) counter/reference electrode. (Note: as is well known to those skilled in the art, results from these test lithium half-cells allow for reliable prediction of electrode materials performance in lithium ion batteries.) Two layers of Celgard 2300 separator and one layer of blown microfiber (3M company) were used in each coin lithium half-cell. 1M LiPF$_6$ (BASF) in a solution of ethylene carbonate, diethyl carbonate and monofluoroethylene carbonate (volume ratio 3:6:1, all from BASF) was used as electrolyte. Cell assembly was carried out in an Ar-filled glove box. Cells were cycled galvanostatically at 30.0±0.1° C.

Figure 2:
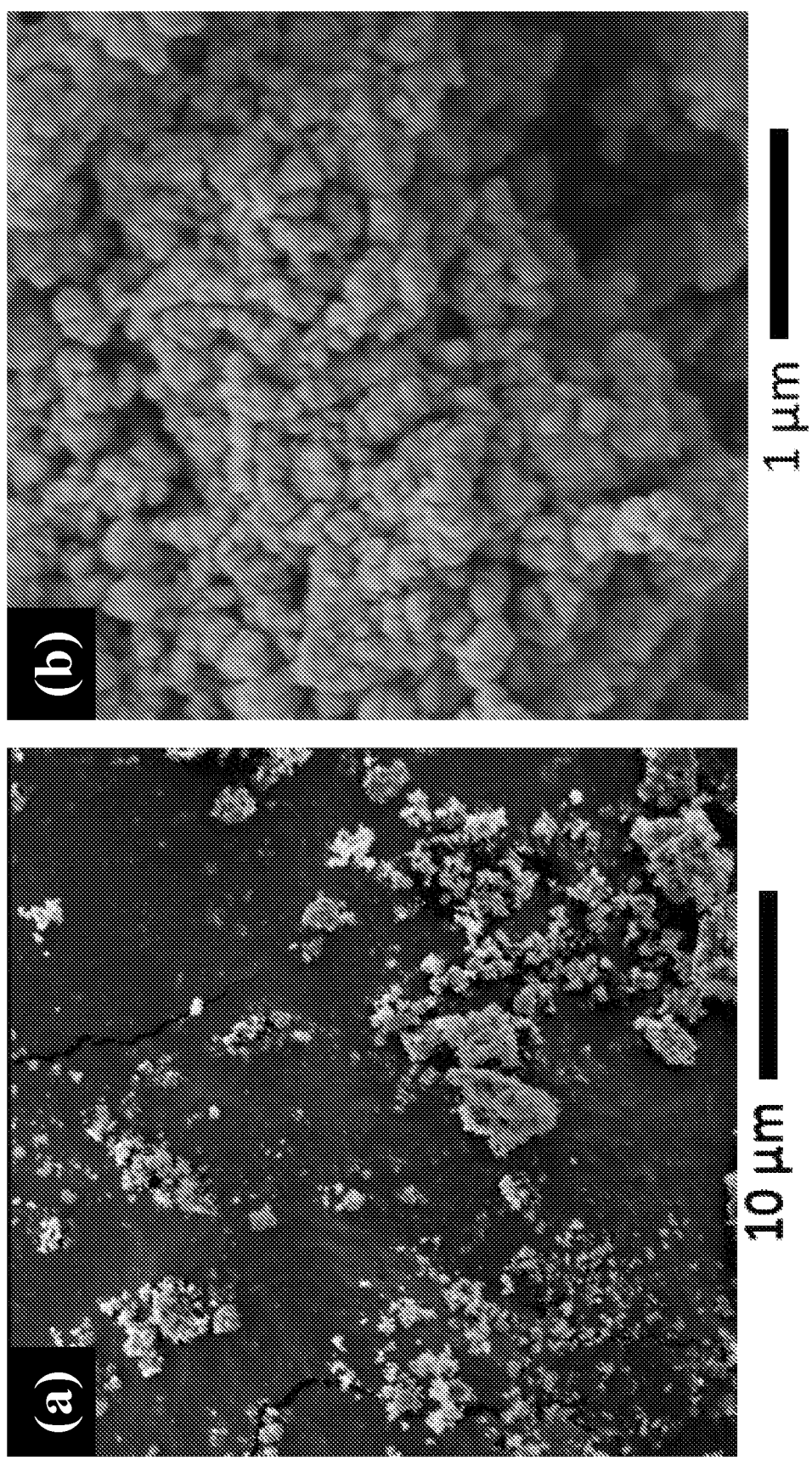
FIGS. 2a and 2b show SEM images of NMC622 precursor particulate of inventive Example 1 and referred to as PM1 therein.

Example 1 (Inventive): NMC622 Precursor Particulate Made by Jar Milling in a Steel Container and with Steel Grinding Media In this method, "NMC" precursor particulate with a stoichiometric metal ratio of 60% Ni, 20% Mn, and 20% Co ("NMC622") was prepared by sealing in air a starting mixture composed of 41.61 g NiO powder (Sigma-Aldrich, −325 mesh, 99%), 13.18 g MnO powder (Aldrich, −60 mesh, 99%), and 14.90 g Co$_3$O$_4$ powder (Alfa Aesar, 99.7%) with 10 kg of 0.5 inch stainless steel balls in a 5 L stainless-steel milling jar (US Stoneware) and milled by rotating the jar for one week at 85 rpm. 87 atomic % of the precursor metals in this starting mixture were in an oxidation state of 2+. 13 atomic % of the precursor metals in this starting mixture were in an oxidation state other than 2+(consisting of Co$^{3+}$). The average oxidation state of the precursor metals in this starting mixture was 2.2. The resulting precursor particulate, hereafter referred to as PM1, was then collected by placing the stainless steel balls after milling on metal sifters stacked on a sieve shaker and running the sieve shaker. An XRD pattern of PM1 is shown in FIG. 1. PM1 has a disordered rock-salt structure with no impurity peaks, confirming that the transition metals are mixed at an atomic scale. Based on the composition of the starting mixture and on the rock-salt structure of PM1, PM1 has the chemical formula Ni$_{0.6}$Mn$_{0.2}$Co$_{0.2}$O. The average grain size of the rock-salt phase was calculated to be ~11 nm from the XRD pattern by the Scherrer method. No phases were present in the sample having grain size larger than 11 nm. The lattice constant of the precursor particulate rock-salt lattice was 4.187 Å. SEM images of PM1 are shown in FIGS. 2a and 2b. It is made up of secondary particles having an average size of about 1 μm, the secondary particles being made up of aggregates of primary particles, the primary particles having an average size of about 100 nm.

Figure 3:
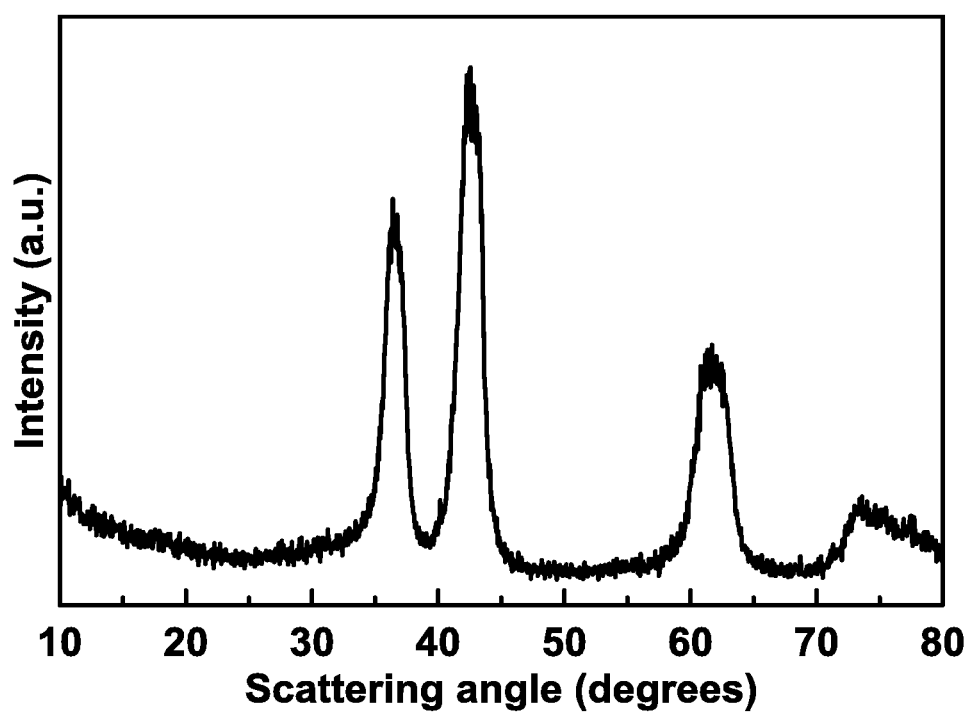
FIG. 3 shows the XRD pattern of NMC111 precursor particulate of inventive Example 2 and referred to as PM2 therein.
Figure 4:
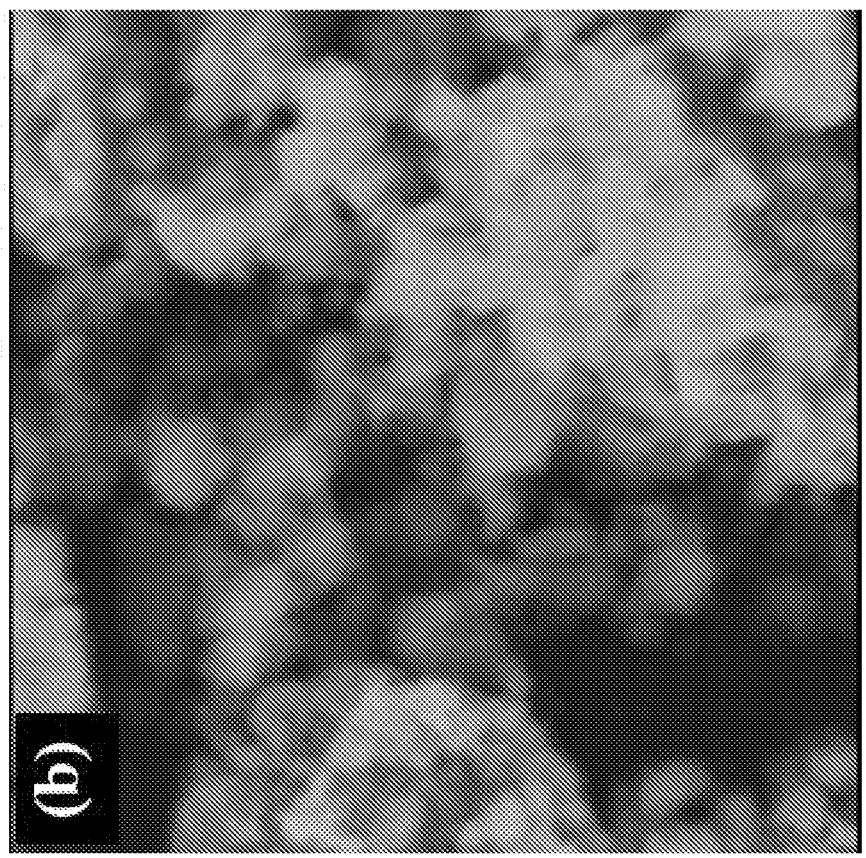
FIGS. 4a and 4b show SEM images of NMC111 precursor particulate of inventive Example 2 and referred to as PM2 therein.
Figure 4:
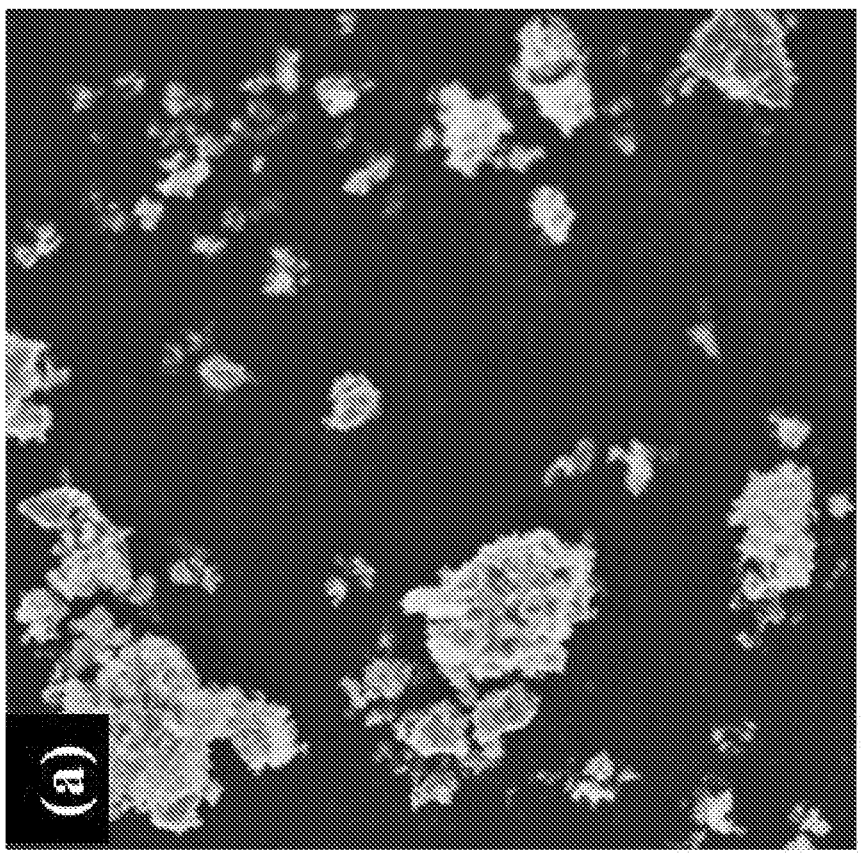

Example 2 (Inventive): "NMC622" Precursor Particulate Made by High Energy Ball Milling in a Steel Container and with Steel Grinding Media In this method, "NMC" precursor particulate with a stoichiometric metal ratio of 33% Ni, 33% Mn, and 33% Co ("NMC111") was prepared by sealing in air a starting mixture consisting of 0.83 g NiO powder (Sigma-Aldrich, −325 mesh, 99%), 0.79 g MnO powder (Aldrich, −60 mesh, 99%), and 0.83 g CoO powder (Alfa Aesar, 99.7%) with 180 g of ⅛ inch stainless steel balls in a 65 ml hardened steel milling vial (Spex CertiPrep, Metuchen, N.J.) and milled using a high energy ball mill (SPEX Model 8000-D, Spex CertiPrep, Metuchen, N.J.) for 2 hours. This starting mixture includes only precursor metals in their 2+ oxidation state and consists only of metal monoxides. 100 atomic % of the precursor metals in this starting mixture were in an oxidation state of 2+. 0 atomic % of the precursor metals in this starting mixture have an oxidation state other than 2+(consisting of Co$^{3+}$). The average oxidation state of the precursor metals in this starting mixture was 2. The resulting precursor particulate, hereafter referred to as PM2, was then collected by further milling the mixture with ~10 ml of ethanol for another 5 minutes, recovering the slurry and drying in air at 120° C. An XRD pattern of PM2 is shown in FIG. 3. It has a single-phase rock-salt structure with no impurity peaks, confirming that the transition metals are mixed at an atomic scale. Based on the composition of the starting mixture and on the rock-salt structure of PM2, PM2 has the chemical formula Ni$_{0.33}$ Mn$_{0.33}$ Co$_{0.33}$O. The average grain size of the rock-salt phase was calculated to be ~4 nm from the XRD pattern by the Scherrer method. No phases were present in the sample having grain size larger than 4 nm. The lattice constant of the precursor particulate rock-salt lattice was 4.248 Å. SEM images of PM2 are shown in FIGS. 4a and 4b. It is made up of secondary particles having an average size of about 1 μm, the secondary particles being made up of aggregates of primary particles, the primary particles having an average size of about 100 nm.

Example 3 (Comparative)

"NMC622" Precursor Particulate Made by Hand Grinding

Figure 5:
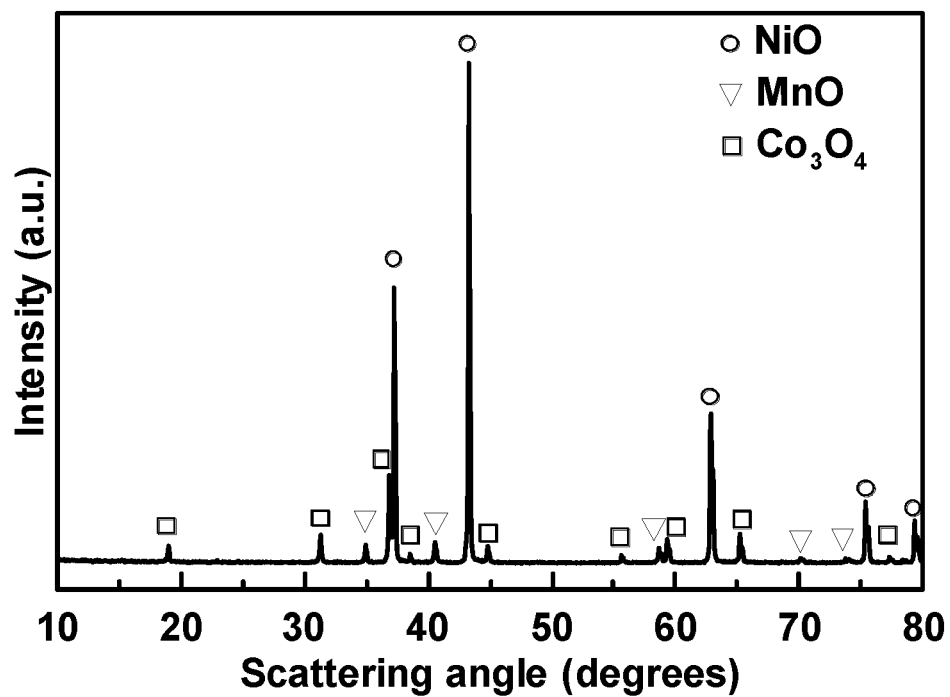
FIG. 5 shows the XRD pattern of NMC622 precursor particulate of comparative Example 3 and referred to as PM3 therein.

In this method, "NMC622" precursor particulate was prepared by mixing in air a starting mixture of 2.50 g NiO powder (Sigma-Aldrich, −325 mesh, 99%), 0.79 g MnO powder (Aldrich, −60 mesh, 99%), and 0.89 g Co$_3$O$_4$ powder (Alfa Aesar, 99.7%), using a mortar and pestle for 10 minutes. 87 atomic % of the precursor metals in this starting mixture were in an oxidation state of 2+. 13 atomic % of the precursor metals in this starting mixture were in an oxidation state other than 2+(consisting of $Co^{3+}$). The average oxidation state of the precursor metals in this starting mixture was 2.2. The resulting precursor particulate, hereafter referred to as PM3, was then collected for further study. An XRD pattern of PM3 is shown in FIG. 5. It has a multiphase crystalline structure in which all the peaks can be assigned to NiO, MnO, and $Co_3O_4$. The average grain size of the rock-salt phase was too large to calculate from XRD (i.e. larger than 80 nm).

Figure 6:
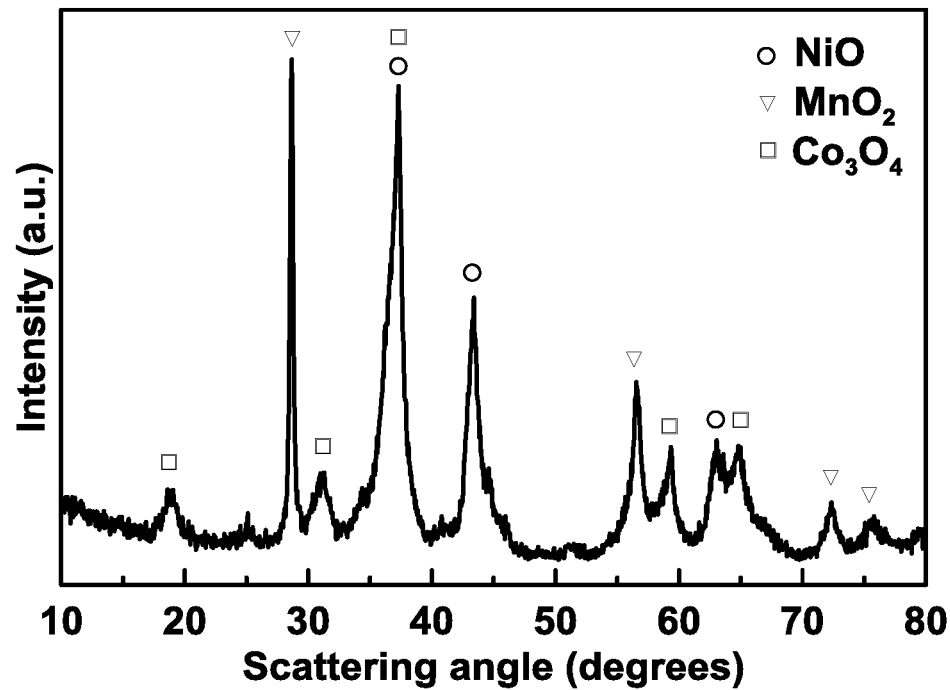
FIG. 6 shows the XRD pattern of NMC111 precursor particulate of comparative Example 4 and referred to as PM4 therein.

Example 4 (Comparative): NMC Precursor Particulate Made from a Starting Mixture Containing Greater than 50% Metal Compounds in which the Oxidation State of the Metal was not $2^+$ In this method, "NMC" precursor particulate with a stoichiometric metal ratio of 33% Ni, 33% Mn, and 33% Co ("NMC111") was prepared by sealing in air a starting mixture consisting of 0.83 g NiO powder (Sigma-Aldrich, –325 mesh, 99%), 0.97 g $MnO_2$ powder (Aldrich, –60 mesh, 99%), and 0.89 g $CO_3O_4$ powder (Alfa Aesar, 99.7%) with 180 g of ⅛ inch stainless steel balls in a 65 ml hardened steel milling vial (Spex CertiPrep, Metuchen, NJ) and milled using a high energy ball mill (SPEX Model 8000-D, Spex CertiPrep, Metuchen, NJ) for 2 hours. 44% of the precursor metals in this starting mixture were in an oxidation state of $2^+$. 56% of the precursor metals in this starting mixture were in an oxidation state other than 2+(consisting of $Co^{3+}$ and $Mn^{4+}$). The average oxidation state of the precursor metals in this starting mixture was 2.9. The resulting precursor particulate, hereafter referred to as PM4, was then collected by further milling the mixture with ~10 ml of ethanol for another 5 minutes, recovering the slurry and drying in air at 120° C. An XRD pattern of PM4 is shown in FIG. 6. It comprises multiple phases, including NiO, $MnO_2$, and $Co_3O_4$. The average grain size of the $MnO_2$ phase was calculated to be 58 nm from the XRD pattern by the Scherrer method.

Example 5 (Inventive)

A sample of SC-LiNMC lithium transition metal oxide particulate (hereafter referred to as SC-LiNMC-1) was prepared as follows. 3 g of the PM1 precursor was ground by mortar and pestle with 1.64 g of $Li_2CO_3$ (Alfa Aesar, 99%), corresponding to 10% excess lithium content, according to the Li:Ni:Mn:Co ratio given by the formula $LiNi_{0.6}Mn_{0.2}Co_{0.2}O_2$, until a homogeneous mixture was obtained (~10 minutes). The resulting final mixture was placed in an alumina crucible and heated in a tube furnace in air for 12 hours at 940° C. Finally, the product was ground to fine powder by hand in a mortar and pestle and passed through a 38 μm sieve to form SC-LiNMC-1 lithium transition metal oxide particulate, having a composition of $LiNi_{0.6}Mn_{0.2}Co_{0.2}O_2$.

Figure 7:
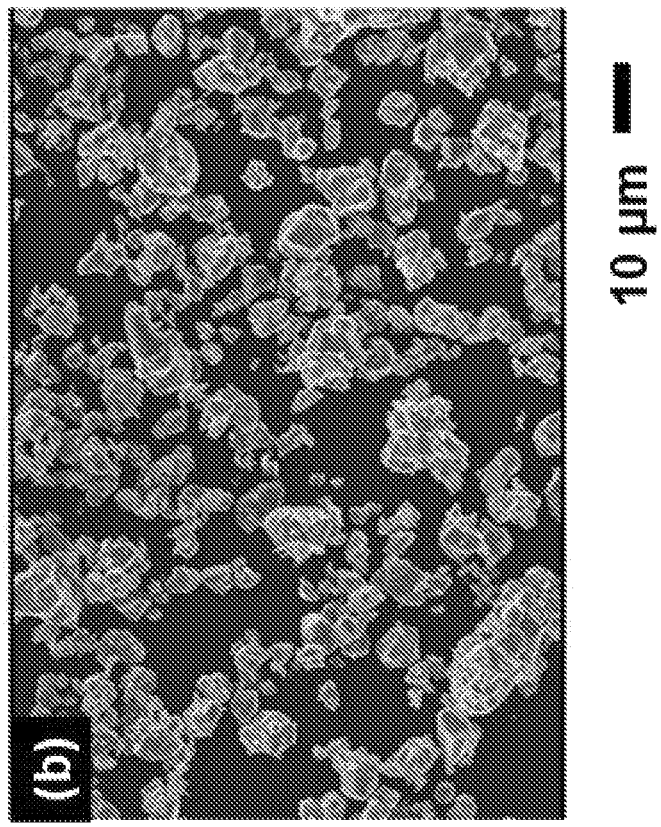
FIGS. 7a and 7b show SEM images of SC-LiNMC-1 lithium transition metal oxide particulate of inventive Example 5 at different magnifications.
FIG. 7c shows the XRD pattern of the SC-LiNMC-1 lithium transition metal oxide particulate of inventive Example 5.
FIG. 7d shows the expanded XRD pattern of the SC-LiNMC-1 lithium transition metal oxide particulate of inventive Example 5 in FIG. 7c between 20° and 30°.
FIG. 7e shows the Cu $K_{\alpha 1}/K_{\alpha 2}$ splitting of the (104) peak of the SC-LiNMC-1 lithium transition metal oxide particulate of inventive Example 5.
FIG. 7f shows the (003) peak of the SC-LiNMC-1 lithium transition metal oxide particulate of inventive Example 5.
FIG. 7g shows the first cycle potential profile of the laboratory test cell made with SC-LiNMC-1 lithium transition metal oxide particulate of inventive Example 5.
Figure 7:
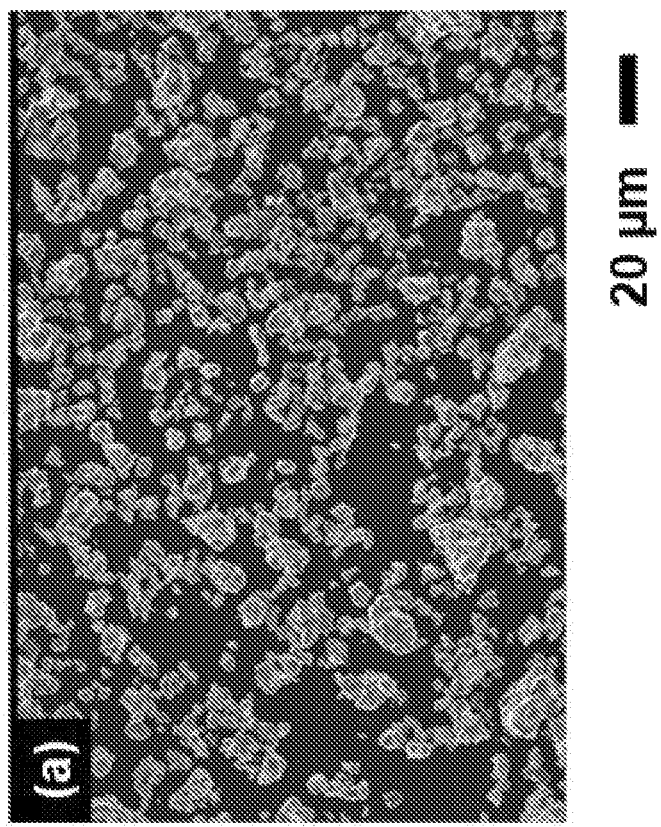
Figure 7C:
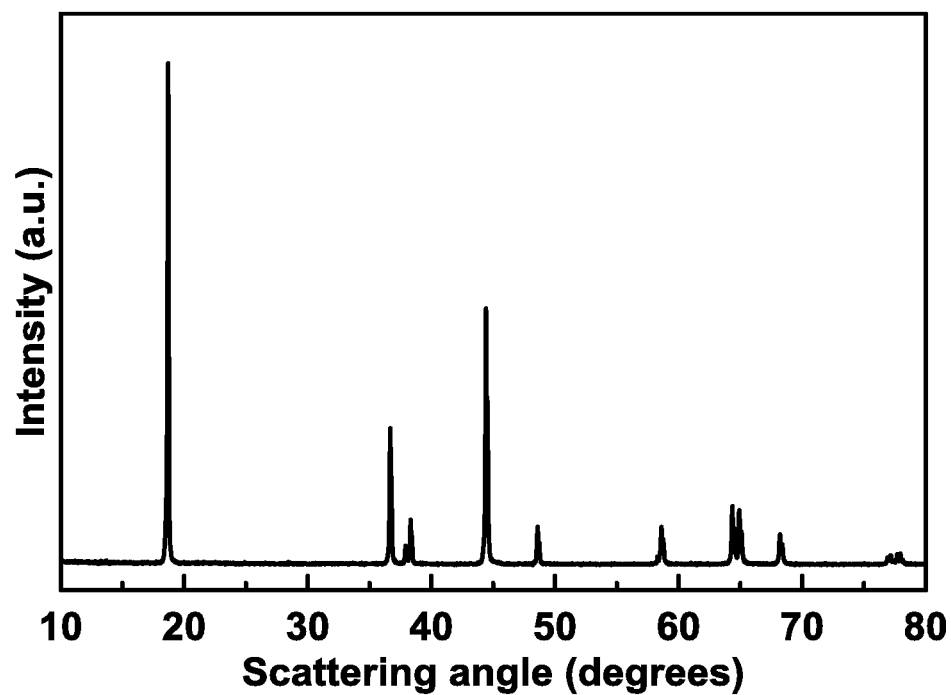
Figure 7D:
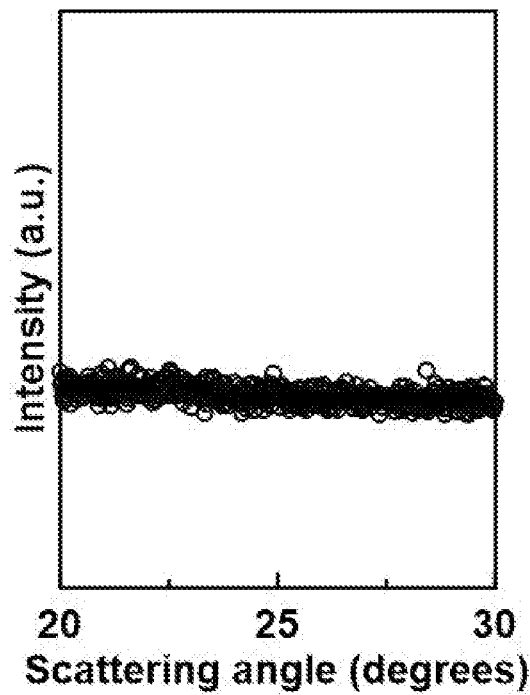
Figure 7E:
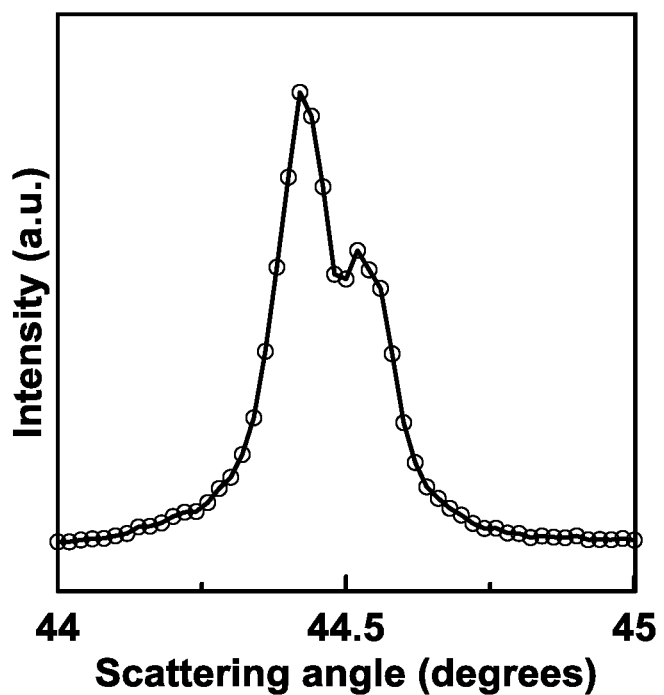
Figure 7F:
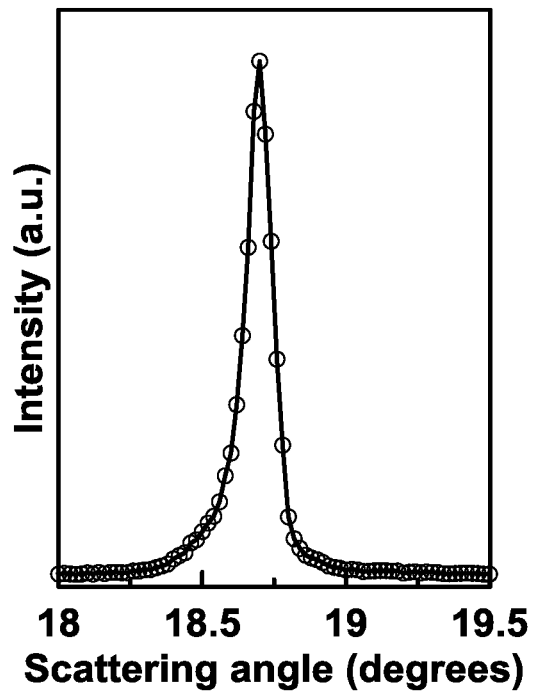

FIGS. 7a and 7b are SEM images of SC-LiNMC-1 at different magnifications. SC-LiNMC-1 is composed of particles, with an average particle size of 4 μm and having an average facet size of 3 μm, corresponding to an average facet size that is 75% of the average particle size. The single crystal particles have clear facets. FIG. 7c shows an XRD pattern of SC-LiNMC-1. SC-LiNMC-1 is phase pure O3 phase, with no impurities, as can be seen in the expanded XRD pattern between 20°and 30° shown in FIG. 7d. The Cu $K_{\alpha 1}/K_{\alpha 2}$ splitting of the (104) peak (at ~44.5°) is pronounced, as shown in FIG. 7e, indicating an extremely high degree of crystallinity. The measured peak width of the (003) peak, shown in FIG. 7f, is 0.110, which is the instrumental broadening error. Therefore, the crystallite size is too large for the instrument to measure (i.e. larger than about 0.05 μm). The 003/104 intensity ratio is 1.308, and the c/a ratio is 4.957.

Figure 7G:
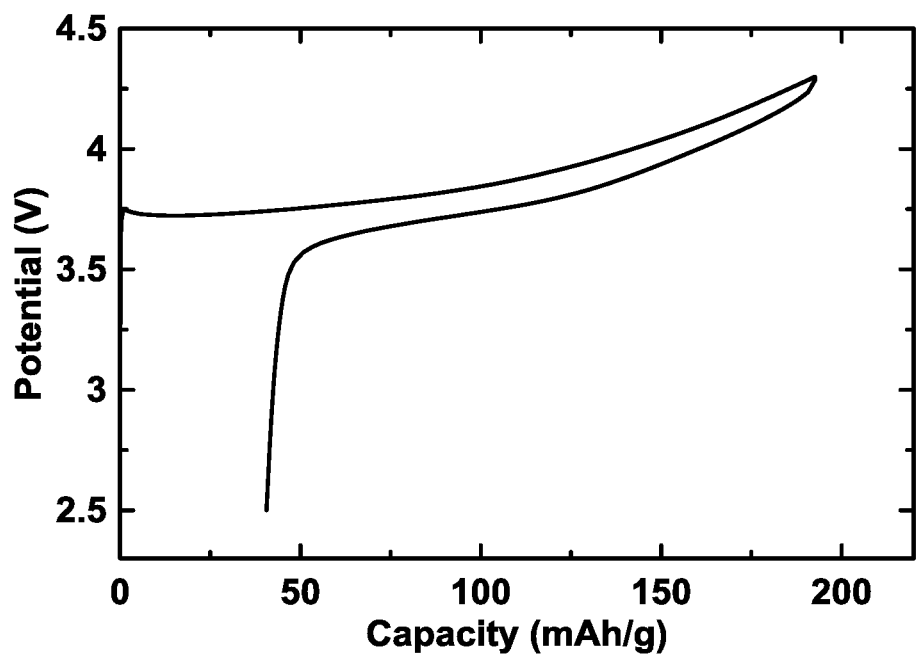

FIG. 7g shows the first cycle potential profile of a laboratory test cell made with SC-LiNMC-1. When cycled between 2.5 V-4.3 V at C/20 (10 mA/g), a reversible capacity of ~150 mA/g can be obtained.

Example 6 (Inventive)

A sample of SC-LiNMC lithium transition metal oxide particulate (hereafter referred to as SC-LiNMC-2) was prepared as follows. 3 g of the PM1 precursor was ground by mortar and pestle with 1.71 g of $Li_2CO_3$ (Alfa Aesar, 99%), corresponding to 15% excess lithium content, according to the Li:Ni:Mn:Co ratio given by the formula $LiNi_{0.6}Mn_{0.2}Co_{0.2}O_2$, until a homogeneous mixture was obtained (~10 minutes). The resulting final mixture was placed in an alumina crucible and heated in a tube furnace in air for 12 hours at 940° C. Finally, the product was ground to fine powder by hand in a mortar and pestle and passed through a 38 μm sieve to form SC-LiNMC-2 lithium transition metal oxide particulate, having a composition of $LiNi_{0.6}Mn_{0.2}Co_{0.2}O_2$.

Figure 8:
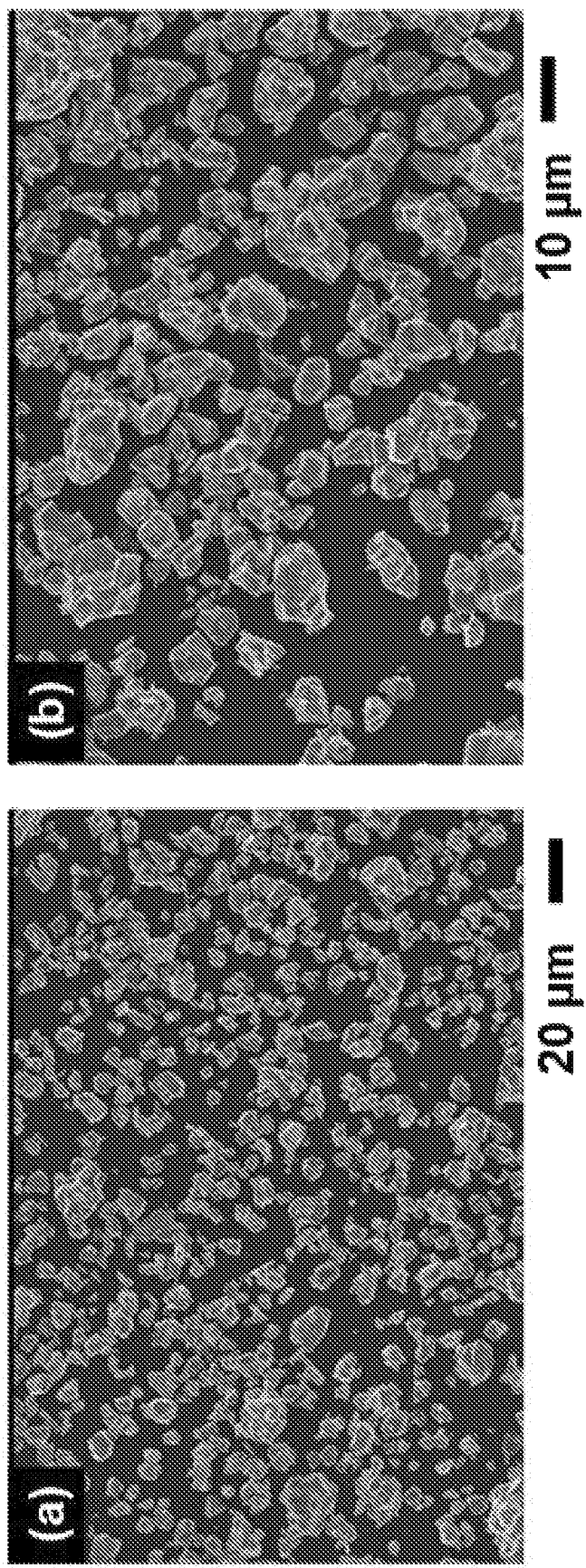
FIGS. 8a and 8b show SEM images of SC-LiNMC-2 lithium transition metal oxide particulate of inventive Example 6 at different magnifications.
FIG. 8c shows the XRD pattern of the SC-LiNMC-2 lithium transition metal oxide particulate of inventive Example 6.
FIG. 8d shows the expanded XRD pattern of the SC-LiNMC-2 lithium transition metal oxide particulate of inventive Example 6 between 20° and 30°.
FIG. 8e shows the Cu $K_{\alpha 1}/K_{\alpha 2}$ splitting of the (104) peak of the SC-LiNMC-2 lithium transition metal oxide particulate of inventive Example 6.
FIG. 8f shows the (003) peak of the SC-LiNMC-2 lithium transition metal oxide particulate of inventive Example 6.
FIG. 8g shows the first cycle potential profile of the laboratory test cell made with SC-LiNMC-2 lithium transition metal oxide particulate of inventive Example 6.
Figure 8C:
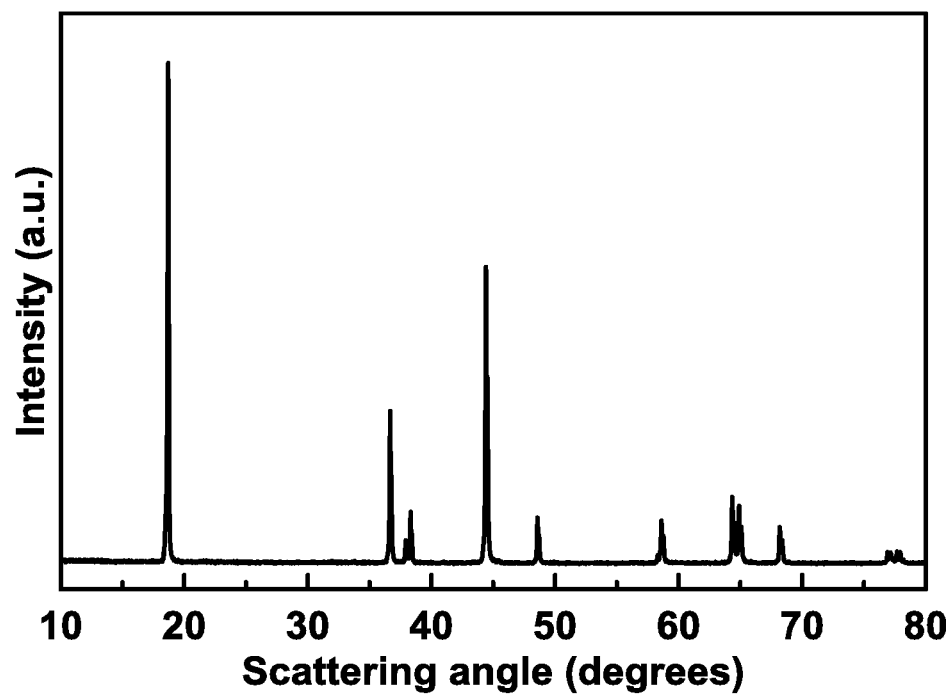
Figure 8D:
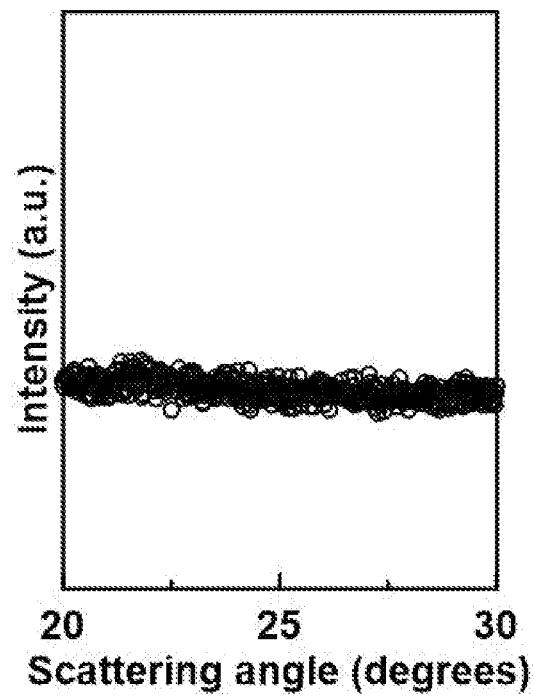
Figure 8E:
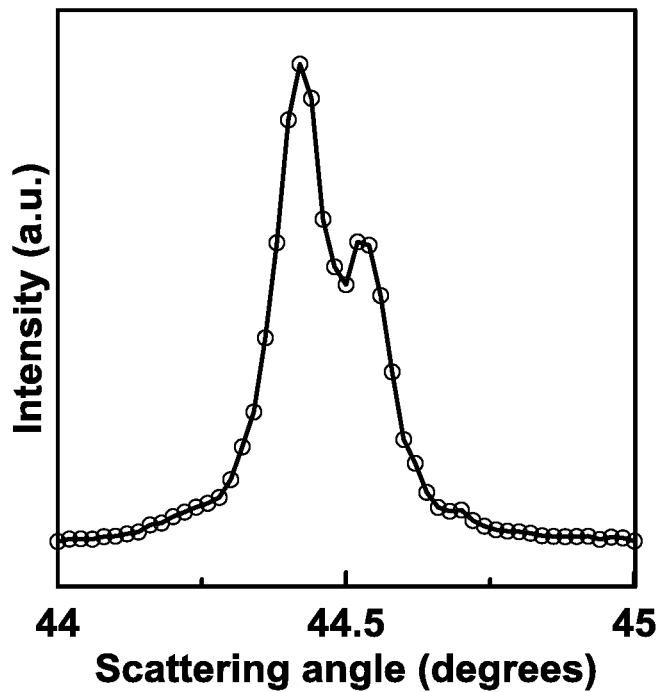
Figure 8F:
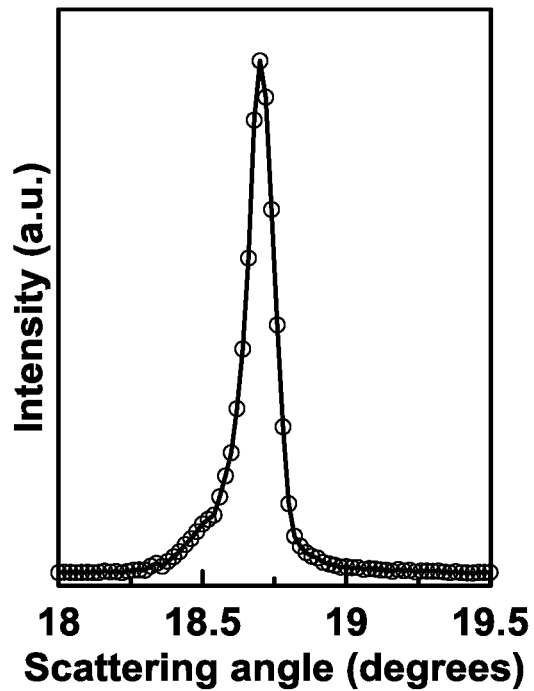

FIGS. 8a and 8b are SEM images of SC-LiNMC-2 at different magnifications. SC-LiNMC-2 is composed of particles having an average particle size of 4 μm and an average facet size of 3 μm, corresponding to an average facet size that is 75% of the average particle size. The single crystal particles have clear facets. FIG. 8c shows an XRD pattern of SC-LiNMC-2. SC-LiNMC-2 is phase pure $O_3$ phase, with no impurities, as can be seen in the expanded XRD pattern between 20° and 30° shown in FIG. 8d. The Cu $K_{\alpha 1}/K_{\alpha 2}$ splitting of the (104) peak (at ~44.5°) is pronounced, as shown in FIG. 8e, indicating an extremely high degree of crystallinity. The measured peak width of the (003) peak, shown in FIG. 8f, is 0.11°, which is the instrumental broadening error. Therefore, the crystallite size is too large for the instrument to measure (i.e. larger than about 0.05 μm). The 003/104 intensity ratio is 1.229, and the c/a ratio is 4.956.

Figure 8G:
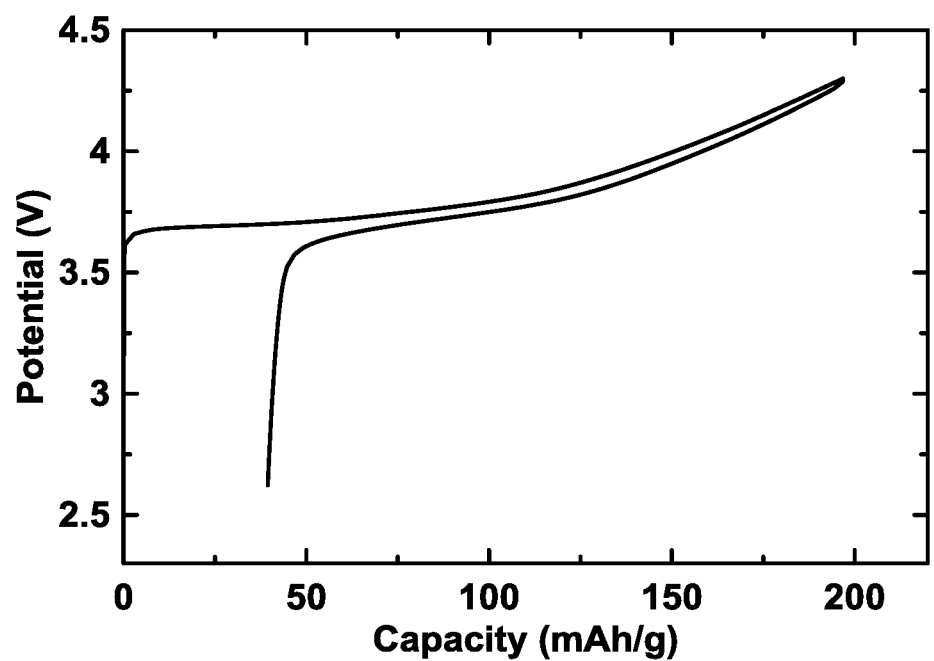

FIG. 8g shows the first cycle potential profile of a laboratory test cell made with SC-LiNMC-2. When cycled between 2.5 V-4.3 V at C/20 (10 mA/g), a reversible capacity of ~160 mA/g can be obtained.

Example 7 (Inventive)

A sample of SC-LiNMC lithium transition metal oxide particulate (hereafter referred to as SC-LiNMC-3) was prepared as follows. 3 g of the PM1 precursor was ground by mortar and pestle with 1.79 g of $Li_2CO_3$ (Alfa Aesar, 99%), corresponding to 20% excess lithium content, according to the Li:Ni:Mn:Co ratio given by the formula $LiNi_{0.6}Mn_{0.2}Co_{0.2}O_2$, until a homogeneous mixture was obtained (~10 minutes). The resulting final mixture was placed in an alumina crucible and heated in a tube furnace in air for 12 hours at 940° C. Finally, the product was ground to fine powder by hand in a mortar and pestle and passed through a 38 μm sieve to form SC-LiNMC-3 lithium transition metal oxide particulate, having a composition of $LiNi_{0.6}Mn_{0.2}Co_{0.2}O_2$.

Figure 9:
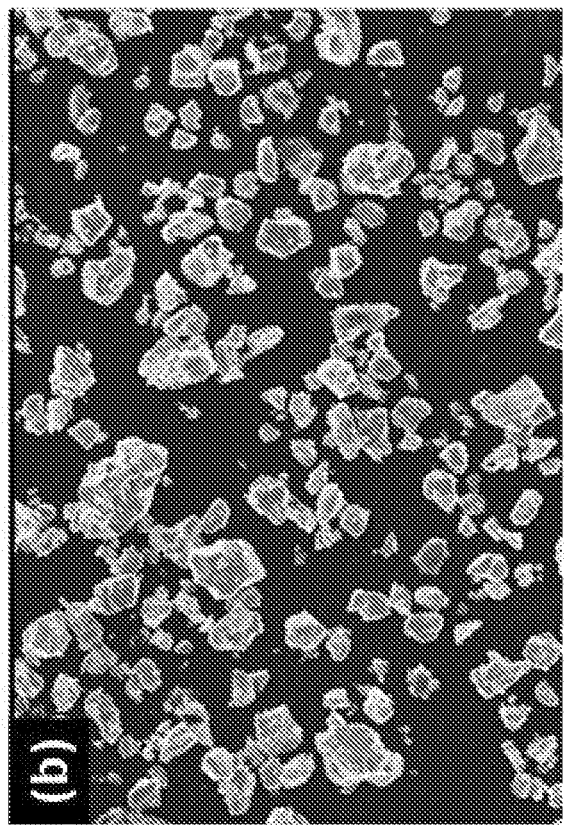
FIGS. 9a and 9b show SEM images of SC-LiNMC-3 lithium transition metal oxide particulate of inventive Example 7 at different magnifications.
FIG. 9c shows the XRD pattern of the SC-LiNMC-3 lithium transition metal oxide particulate of inventive Example 7.
FIG. 9d shows the expanded XRD pattern of the SC-LiNMC-3 lithium transition metal oxide particulate of inventive Example 7 between 20° and 30°.
FIG. 9e shows the Cu $K_{\alpha 1}/K_{\alpha 2}$ splitting of the (104) peak of the SC-LiNMC-3 lithium transition metal oxide particulate of inventive Example 7.
FIG. 9f shows the (003) peak of the SC-LiNMC-3 lithium transition metal oxide particulate of inventive Example 7.
FIG. 9g shows EDS mapping of the SC-LiNMC-3 lithium transition metal oxide particulate of inventive Example 7.
FIG. 9h shows the first cycle potential profile of the laboratory test cell made with SC-LiNMC-3 lithium transition metal oxide particulate of inventive Example 7.
Figure 9:
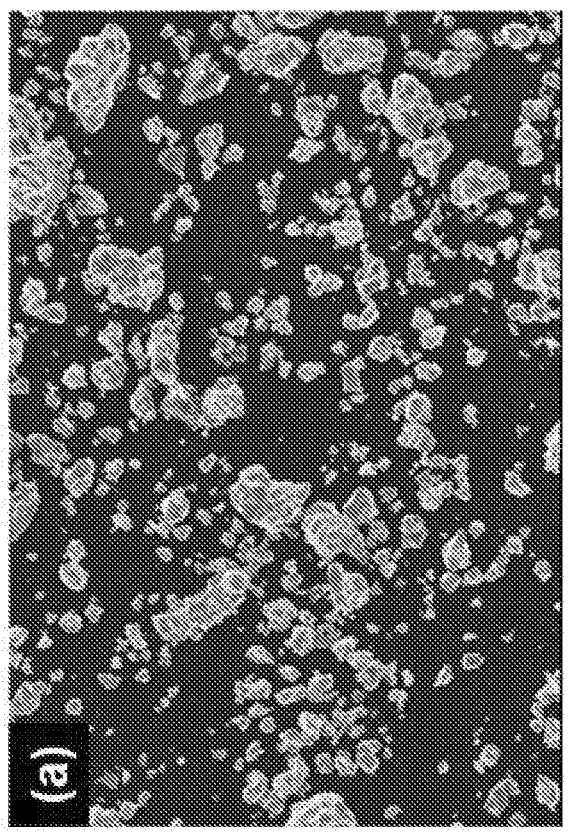
Figure 9C:
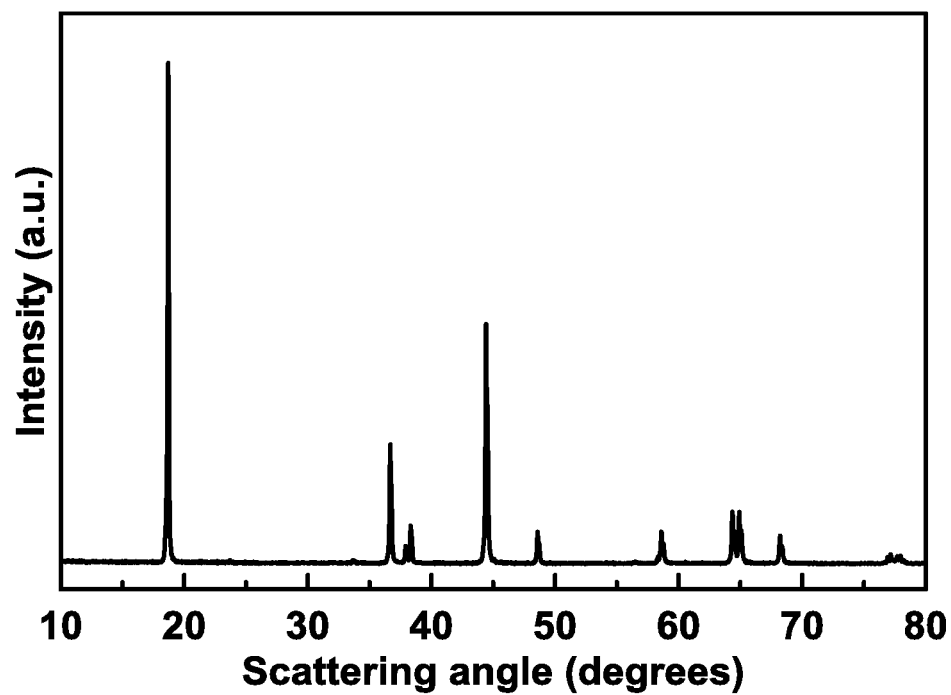
Figure 9D:
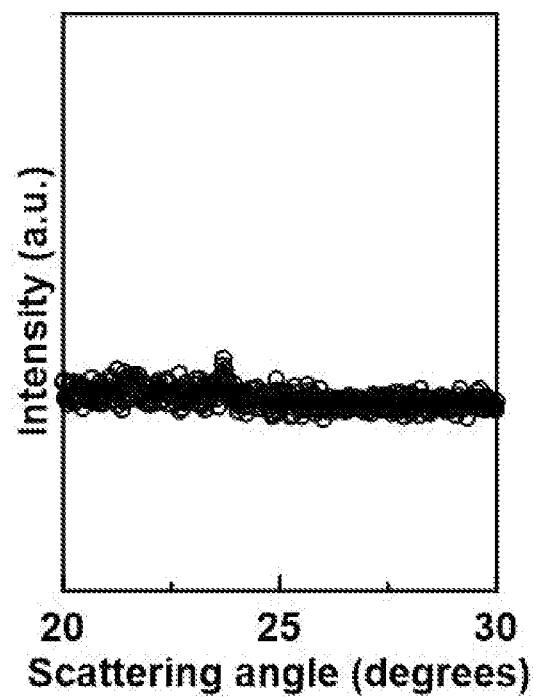
Figure 9E:
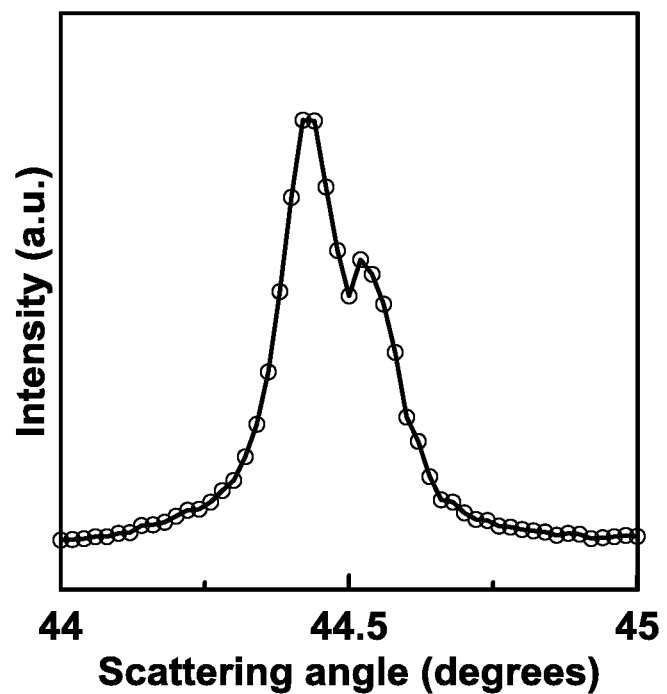
Figure 9F:
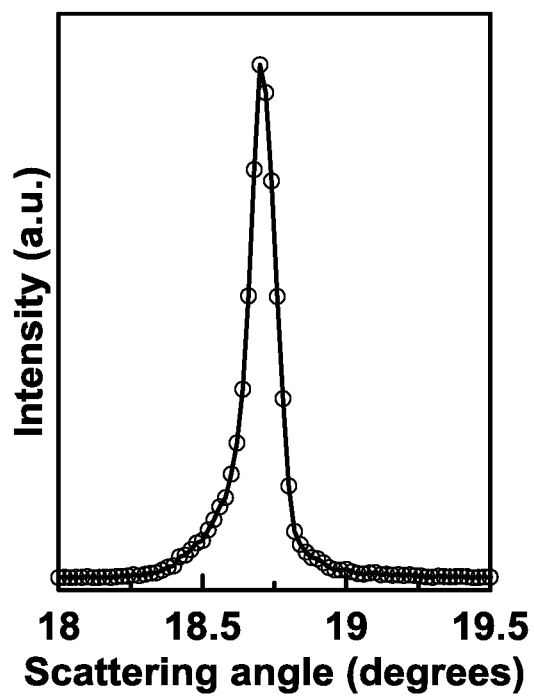
Figure 9G:
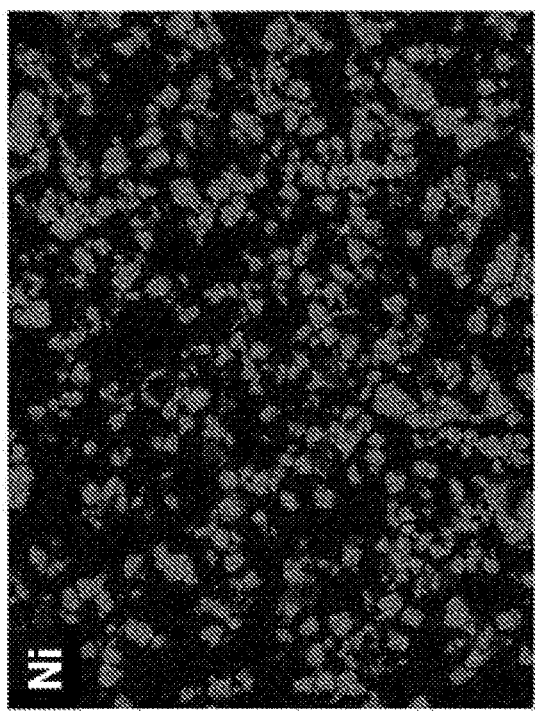
Figure 9G:
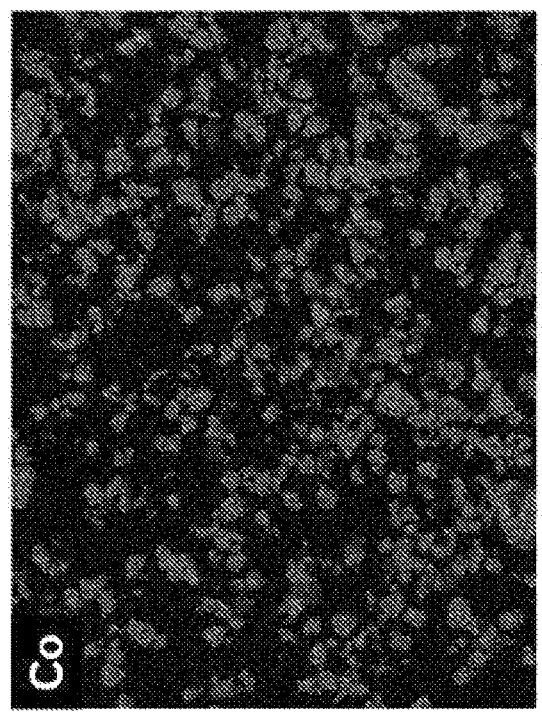
Figure 9G:
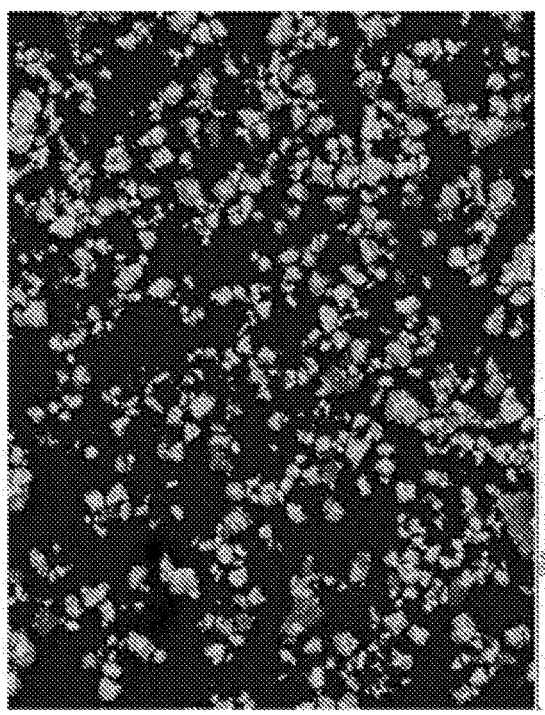
Figure 9G:
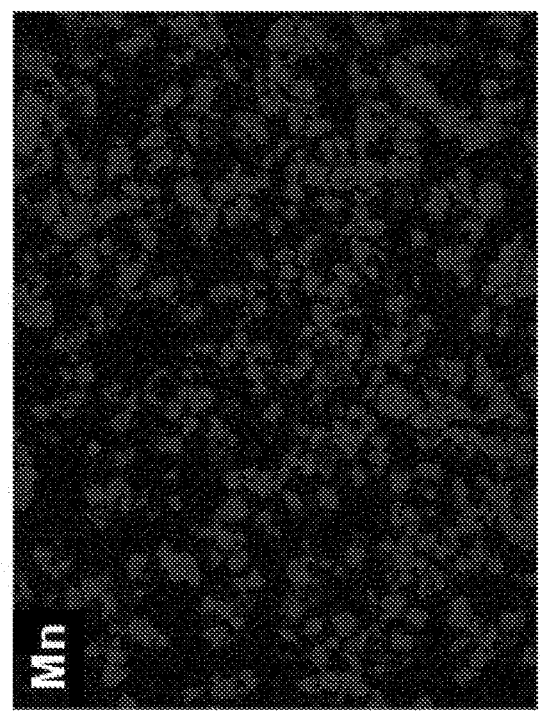

FIGS. 9a and 9b are SEM images of SC-LiNMC-3 at different magnifications. SC-LiNMC-3 is composed of particles having an average particle size of 3 µm and an average facet size of 2 µm, corresponding to an average facet size that is 67% of the average particle size. The single crystal particles have clear facets. FIG. 9c shows an XRD pattern of SC-LiNMC-3. SC-LiNMC-3 is phase pure $O_3$ phase, with no impurities, as can be seen in the expanded XRD pattern between 20° and 30° shown in FIG. 9d. The Cu $K_{\alpha 1}/K_{\alpha 2}$ splitting of the (104) peak (at ~44.5°) is pronounced, as shown in FIG. 9e, indicating an extremely high degree of crystallinity. The measured peak width of the (003) peak, shown in FIG. 9f, is 0.11°, which is the instrumental broadening error. Therefore, the crystallite size is too large for the instrument to measure (i.e., larger than about 0.05 µm). The 003/104 intensity ratio is 1.355, and the c/a ratio is 4.956. FIG. 9g shows EDS mapping of SC-LiNMC-3. The elemental distributions of Ni, Mn, and Co are homogeneous across the sample.

Figure 9H:
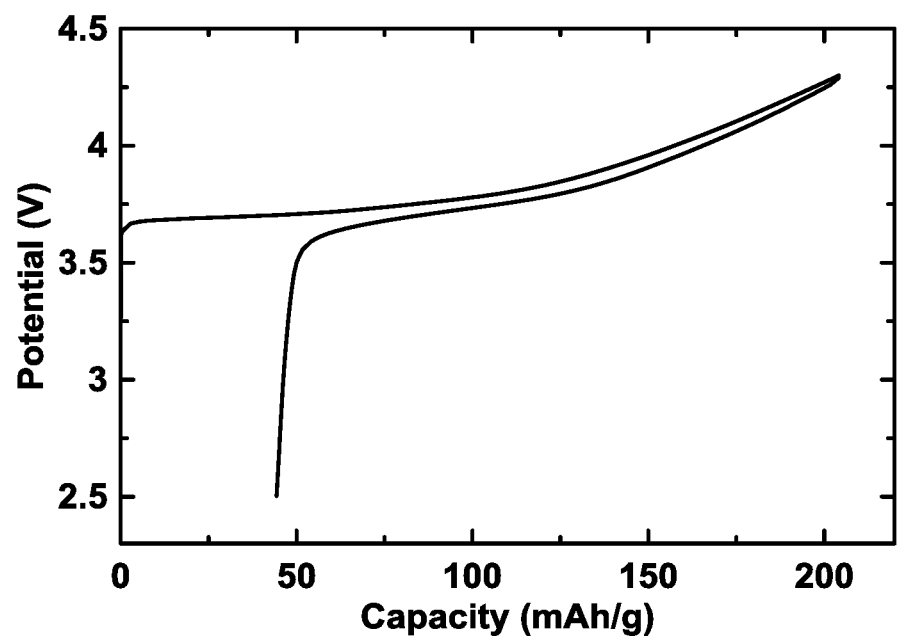

FIG. 9h shows the first cycle potential profile of a laboratory test cell made with SC-LiNMC-3. When cycled between 2.5 V-4.3 V at C/20 (10 mA/g), a reversible capacity of ~160 mA/g can be obtained.

Example 8 (Inventive)

A sample of SC-LiNMC lithium transition metal oxide particulate (hereafter referred to as SC-LiNMC-4) was prepared as follows. 3 g of the PM1 precursor was ground by mortar and pestle with 1.79 g of $Li_2CO_3$ (Alfa Aesar, 99%), corresponding to 20% excess lithium content, according to the Li:Ni:Mn:Co ratio given by the formula $LiNi_{0.6}Mn_{0.2}Co_{0.2}O_2$, until a homogeneous mixture was obtained (~10 minutes). The resulting final mixture was placed in an alumina crucible and heated in a tube furnace in flowing oxygen for 12 hours at 940° C. Finally, the product was ground to fine powder by hand in a mortar and pestle and passed through a 38 µm sieve to form SC-LiNMC-4 lithium transition metal oxide particulate, having a composition of $LiNi_{0.6}Mn_{0.2}Co_{0.2}O_2$.

Figure 10:
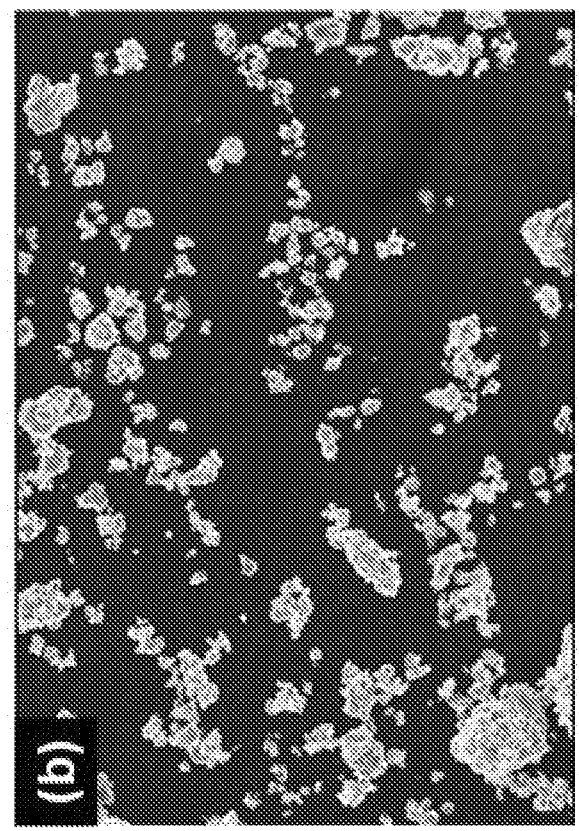
FIGS. 10a and 10b show SEM images of SC-LiNMC-4 lithium transition metal oxide particulate of inventive Example 8 at different magnifications.
FIG. 10c shows the XRD pattern of the SC-LiNMC-4 lithium transition metal oxide particulate of inventive Example 8.
FIG. 10d shows the expanded XRD pattern of the SC-LiNMC-4 lithium transition metal oxide particulate of inventive Example 8 between 20° and 30°.
FIG. 10e shows the Cu $K_{\alpha 1}/K_{\alpha 2}$ splitting of the (104) peak of the SC-LiNMC-4 lithium transition metal oxide particulate of inventive Example 8.
FIG. 10f shows the (003) peak of the SC-LiNMC-4 lithium transition metal oxide particulate of inventive Example 8.
FIG. 10g shows the first cycle potential profile of the laboratory test cell made with SC-LiNMC-4 lithium transition metal oxide particulate of inventive Example 8.
Figure 10:
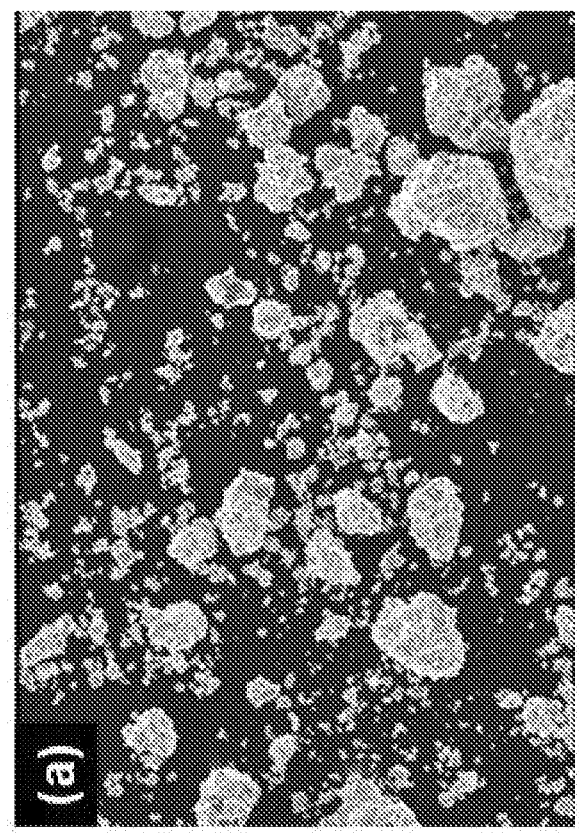
Figure 10C:
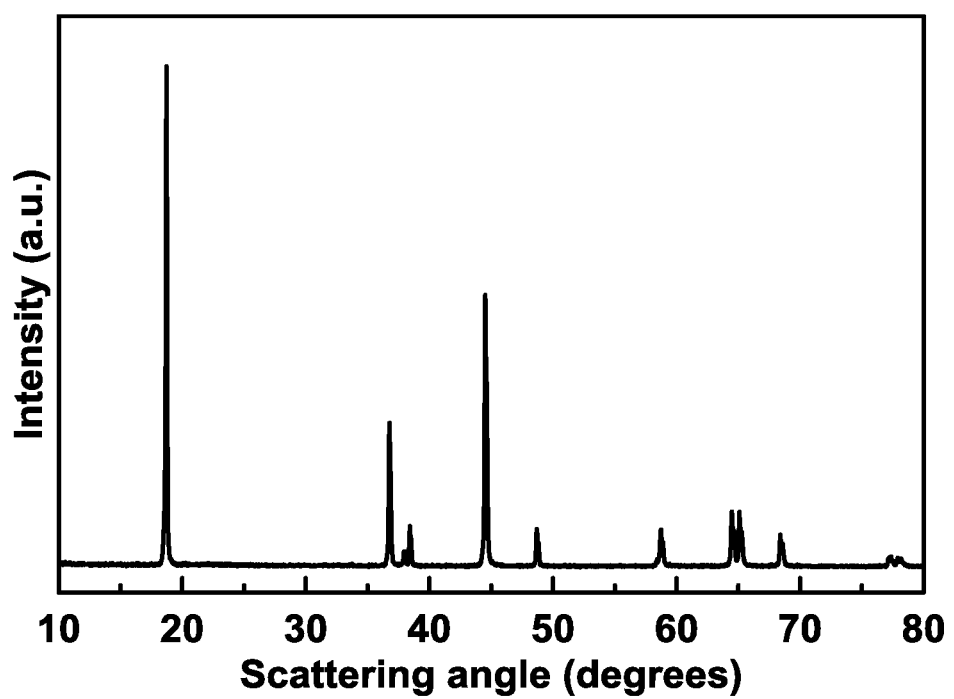
Figure 10D:
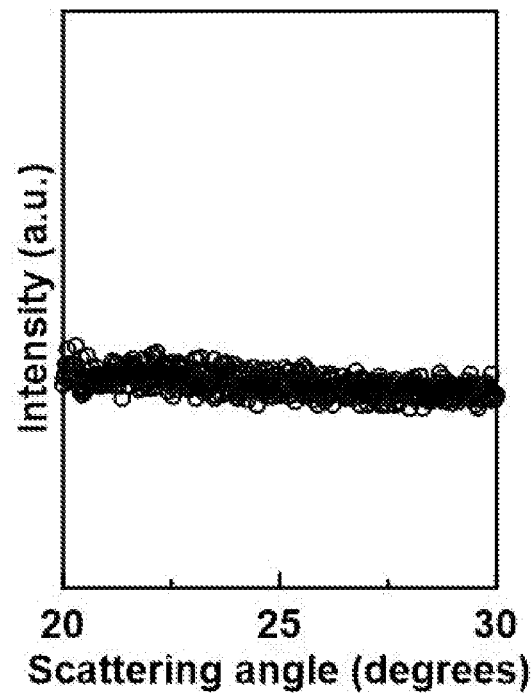
Figure 10E:
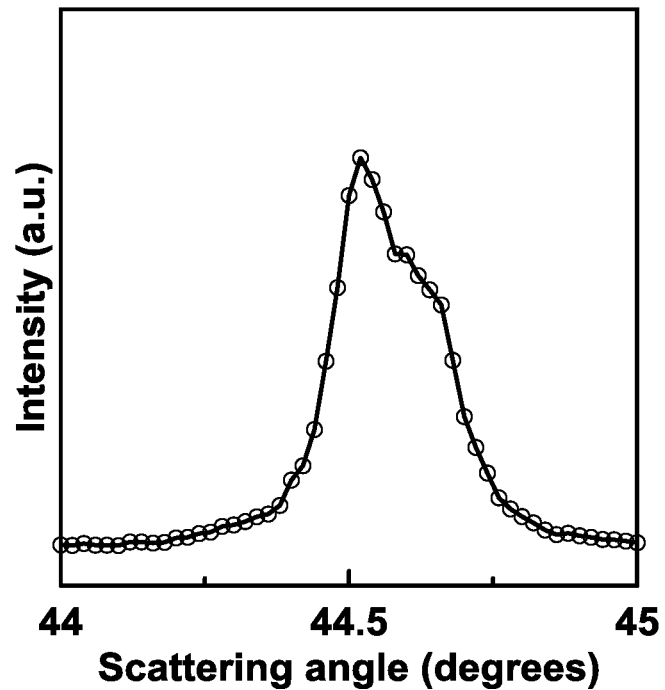
Figure 10F:
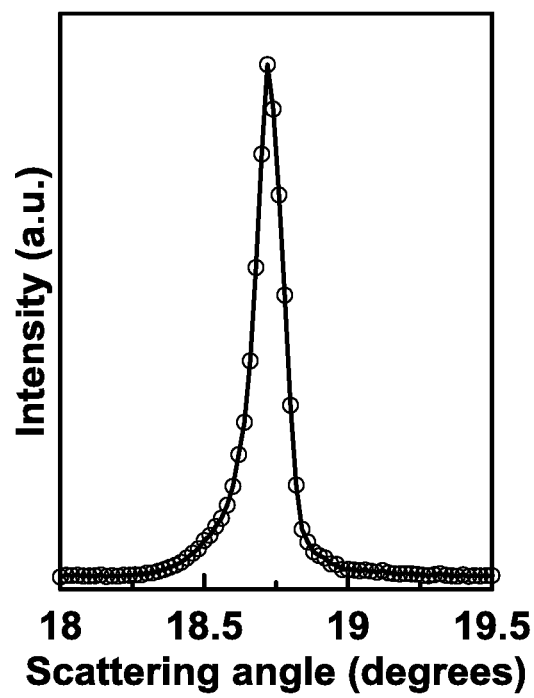

FIGS. 10a and 10b are SEM images of SC-LiNMC-4 at different magnifications. SC-LiNMC-4 is composed of particles having an average particle size of 2 µm and an average facet size of 1 µm, corresponding to an average facet size that is 50% of the average particle size. The particle size is significantly smaller than SC-LiNMC-1, SC-LiNMC-2, and SC-LiNMC-3. This indicates that heating in oxygen does not promote crystal growth, compared to heating in air. FIG. 10c shows an XRD pattern of SC-LiNMC-4. SC-LiNMC-4 is phase pure O3 phase, with no impurities, as can be seen in the expanded XRD pattern between 200 and 300 shown in FIG. 10d. A shoulder on the right side of the (104) peak (at ~44.5°) can be observed, while no Cu $K_{\alpha 1}/K_{\alpha 2}$ peak splitting can be observed, as shown in FIG. 10e, indicating the degree of crystallinity is not as high as SC-LiNMC-1, SC-LiNMC-2, and SC-LiNMC-3. The measured peak width of the (003) peak, shown in FIG. 10f, is 0.11°, which is the instrumental broadening error. Therefore, the crystallite size is too large for the instrument to measure (i.e. larger than about 0.05 µm). The 003/104 intensity ratio is 1.162, and the c/a ratio is 4.964.

Figure 10G:
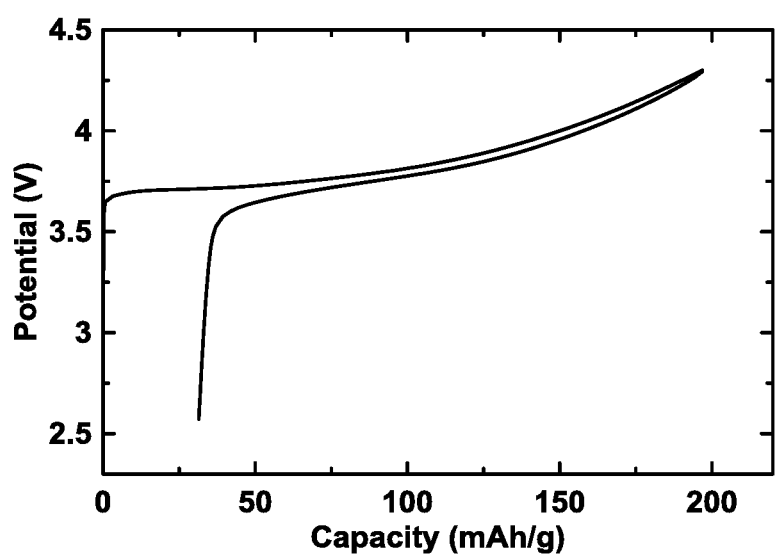

FIG. 10g shows the first cycle potential profile of a laboratory test cell made with SC-LiNMC-4. When cycled between 2.5 V-4.3 V at C/20 (10 mA/g), a reversible capacity of ~170 mA/g can be obtained.

Example 9 (Inventive)

A sample of SC-LiNMC lithium transition metal oxide particulate (hereafter referred to as SC-LiNMC-5) was prepared as follows. 3 g of the PM1 precursor was ground by mortar and pestle with 1.79 g of $Li_2CO_3$ (Alfa Aesar, 99%), corresponding to 20% excess lithium content, according to the Li:Ni:Mn:Co ratio given by the formula $LiNi_{0.6}Mn_{0.2}Co_{0.2}O_2$, until a homogeneous mixture was obtained (~10 minutes). The resulting final mixture was placed in an alumina crucible and heated in a tube furnace in air for 12 hours at 940° C. The heated powder was ground using a mortar and pestle, and heated again in an alumina crucible in a tube furnace in flowing oxygen for 12 hours at 940° C.

Finally, the product was ground to fine powder by hand in a mortar and pestle and passed through a 38 µm sieve to form SC-LiNMC-5 lithium transition metal oxide particulate, having a composition of $LiNi_{0.6}Mn_{0.2}Co_{0.2}O_2$.

Figure 11:
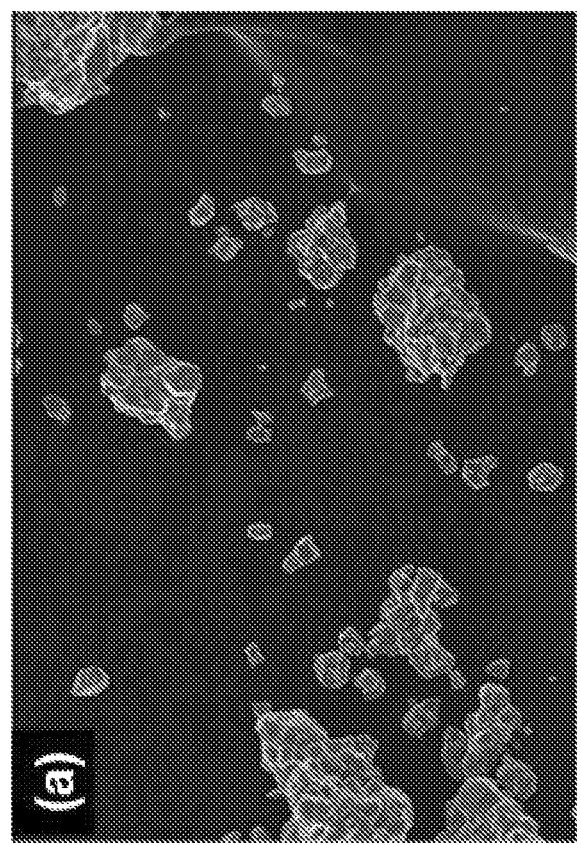
FIGS. 11a and 11b show SEM images of SC-LiNMC-5 lithium transition metal oxide particulate of inventive Example 9 at different magnifications.
FIG. 11c shows the XRD pattern of the SC-LiNMC-5 lithium transition metal oxide particulate of inventive Example 9.
FIG. 11d shows the expanded XRD pattern of the SC-LiNMC-5 lithium transition metal oxide particulate of inventive Example 9 between 20° and 30°.
FIG. 11e shows the Cu $K_{\alpha 1}/K_{\alpha 2}$ splitting of the (104) peak of the SC-LiNMC-5 lithium transition metal oxide particulate of inventive Example 9.
FIG. 11f shows the (003) peak of the SC-LiNMC-5 lithium transition metal oxide particulate of inventive Example 9.
FIG. 11g shows the first cycle potential profile of the laboratory test cell made with SC-LiNMC-5 lithium transition metal oxide particulate of inventive Example 9.
Figure 11:
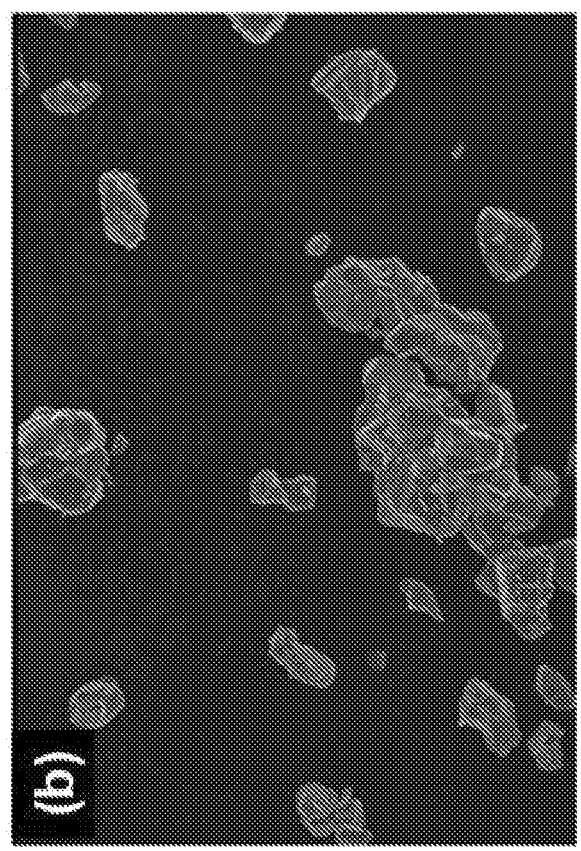
Figure 11C:
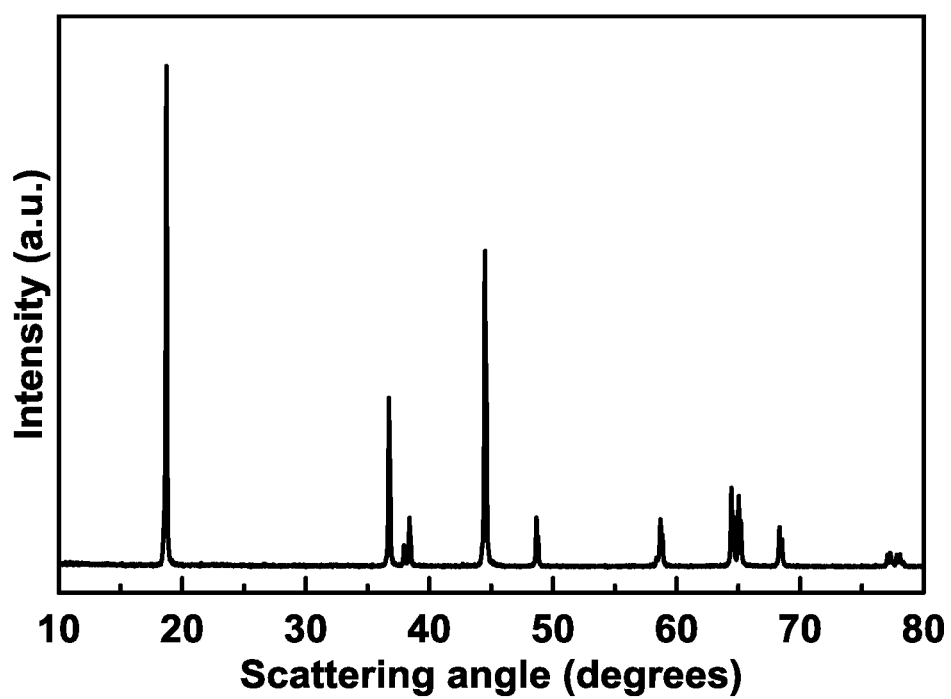
Figure 11D:
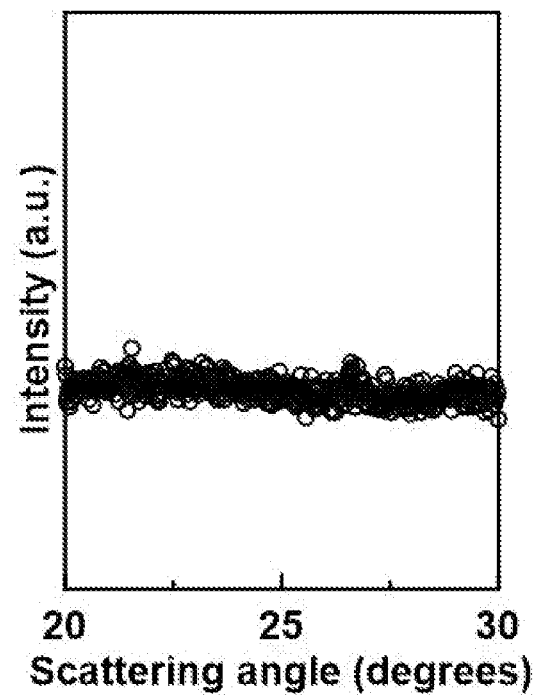
Figure 11E:
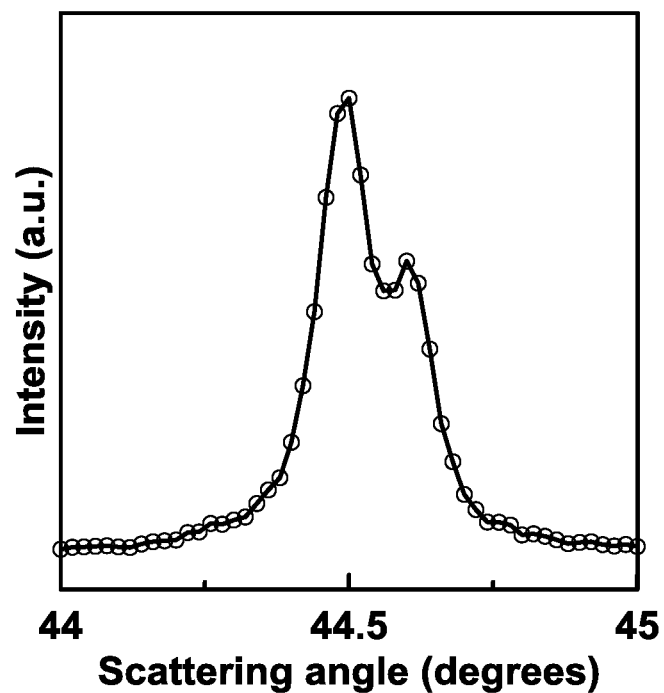
Figure 11F:
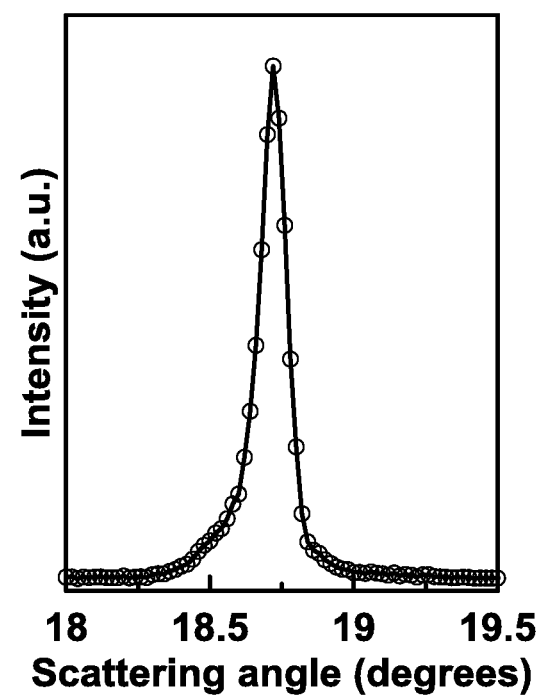

FIGS. 11a and 11b are SEM images of SC-LiNMC-5 at different magnifications. SC-LiNMC-5 is composed of particles having an average particle size of 10 µm and an average facet size of 7 µm, corresponding to an average facet size that is 70% of the average particle size. The single crystal particles have clear facets. FIG. 11c shows an XRD pattern of SC-LiNMC-5. SC-LiNMC-5 is phase pure O3 phase, with no impurities, as can be seen in the expanded XRD pattern between 20° and 30° shown in FIG. 11d. The Cu $K_{\alpha 1}/K_{\alpha 2}$ splitting of the (104) peak (at ~44.5°) is pronounced, as shown in FIG. 11e, indicating an extremely high degree of crystallinity. The measured peak width of the (003) peak, shown in FIG. 11f, is 0.11°, which is the instrumental broadening error. Therefore, the crystallite size is too large for the instrument to measure (i.e., larger than about 0.05 µm). The 003/104 intensity ratio is 1.108, and the c/a ratio is 4.959.

Figure 11G:
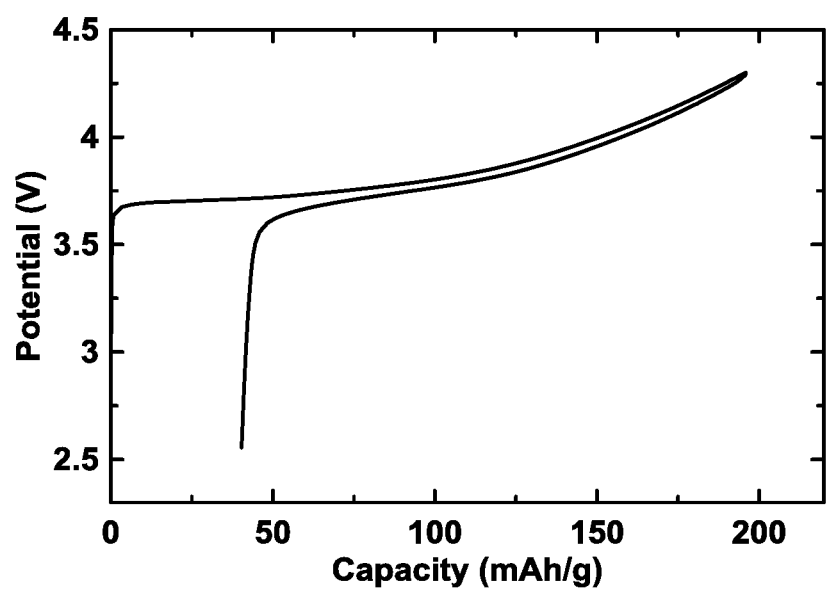

FIG. 11g shows the first cycle potential profile of a laboratory test cell made with SC-LiNMC-5. When cycled between 2.5 V-4.3 V at C/20 (10 mA/g), a reversible capacity of ~160 mA/g can be obtained.

Table 1 summarizes the preparation conditions, crystal parameters, average facet size, and average grain size of samples SC-LiNMC-1 through SC-LiNMC-6 prepared as described in the aforementioned Inventive Examples 5 through 9. In this Table, AFS=average facet size, APS=average particle size, and PFP=facet size as a percent of the average particle size of the final lithium transition metal oxide particulate samples SC-LiNMC-1 through SC-LiNMC-6.

TABLE 1

| Example | Sample Name | Precursor | Excess Li (%) | Conditions Heating | AFS (µm) | APS (µm) | PFP (%) | c/a |
|---|---|---|---|---|---|---|---|---|
| 5 | SC-LiNMC-1 | PM1 | 10 | air | 3 | 4 | 75 | 4.957 |
| 6 | SC-LiNMC-2 | PM1 | 15 | air | 3 | 4 | 75 | 4.956 |
| 7 | SC-LiNMC-3 | PM1 | 20 | air | 2 | 3 | 67 | 4.956 |
| 8 | SC-LiNMC-4 | PM1 | 20 | $O_2$ | 1 | 2 | 50 | 4.964 |
| 9 | SC-LiNMC-5 | PM1 | 20 | air/$O_2$ | 7 | 10 | 70 | 4.959 |

Table 2 summarizes the electrochemical performance parameters of samples SC-LiNMC-1 through SC-LiNMC-6 prepared as described in the aforementioned Inventive Examples 1 through 6. In this Table, RC=reversible capacity, IC=irreversible capacity, and AP=second cycle average polarization (measured as the difference between the average charge and discharge voltage during a cycle in a half-cell).

TABLE 2

| Example | Sample Name | RC (mAh/g) | IC (mAh/g) | AP (mV) |
|---|---|---|---|---|
| 5 | SC-LiNMC-1 | 152 | 41 | 213 |
| 6 | SC-LiNMC-2 | 157 | 39 | 118 |
| 7 | SC-LiNMC-3 | 160 | 44 | 119 |
| 8 | SC-LiNMC-4 | 165 | 31 | 96 |
| 9 | SC-LiNMC-5 | 156 | 40 | 110 |

A high c/a ratio is known to be an indicator of ordered stacking in the O3 structure, which is desirable for NMC in order for the material to have fast lithium diffusion. This parameter is highest for the examples that include a step where the sample is heated in oxygen. Low average polarization (AP) and low irreversible capacity (IC) are desirable traits of "NMC" in Li-ion cells. Low values of AP and IC are also characteristic of good ion ordering in the O3 structure. The AP and IC are lowest for examples that include a step where the sample is heated in oxygen and in which a ceramic mill was used to make the precursor. The facet size and PFP becomes reduced, however, when only oxygen is used during heating. Therefore, in some embodiments, it seems preferred to heat firstly in air to promote grain growth and then secondly in oxygen to promote a more ordered crystal structure.

Without being bound by theory, it is believed that the reduced polarization in the IE6 sample is the result of the use of ball milling with a non-ferrous mill and milling balls. This avoids iron contamination in the sample. The presence of iron has been shown to induce cation mixing (Korean J. Chem. Eng., 24(5), 888-891 (2007)), which is known to increase polarization and cause cell fade. In addition, iron contamination changes the lithium:transition metal ratio from the intended value, which is not desired in a commercial production process.

Example 10 (Comparative)

A sample of LiNMC lithium transition metal oxide particulate (hereafter referred to as CE-LiNMC-1) was prepared as follows: 3 g of the comparative PM3 precursor was ground by mortar and pestle with 1.79 g of $Li_2CO_3$ (Alfa Aesar, 99%), corresponding to 20% excess lithium content, according to the Li:Ni:Mn:Co ratio given by the formula $LiNi_{0.6}Mn_{0.2}Co_{0.2}O_2$, until a homogeneous mixture was obtained (~10 minutes). The mixture was placed in an alumina crucible and heated in a tube furnace in air for 12 hours at 940° C. Finally, the product was ground to fine powder by hand in a mortar and pestle and passed through a 38 μm sieve to form CE-LiNMC-1 lithium transition metal oxide particulate, having a composition of $LiNi_{0.6}Mn_{0.2}Co_{0.2}O_2$.

Figure 12A:
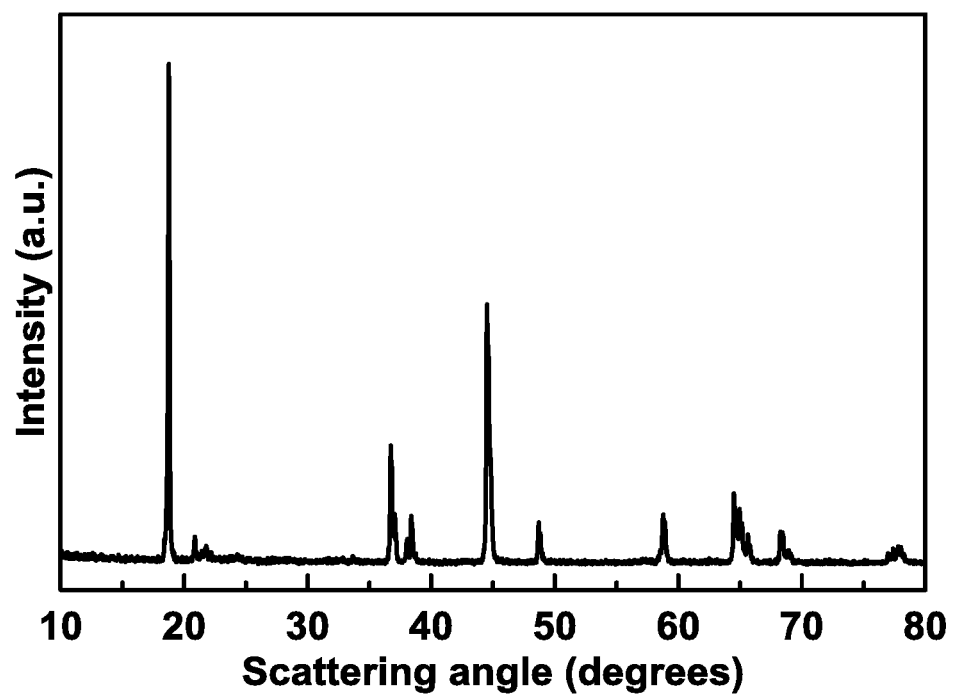
FIG. 12a shows the XRD pattern of CE-LiNMC-1 lithium transition metal oxide particulate of comparative Example 10.
Figure 12B:
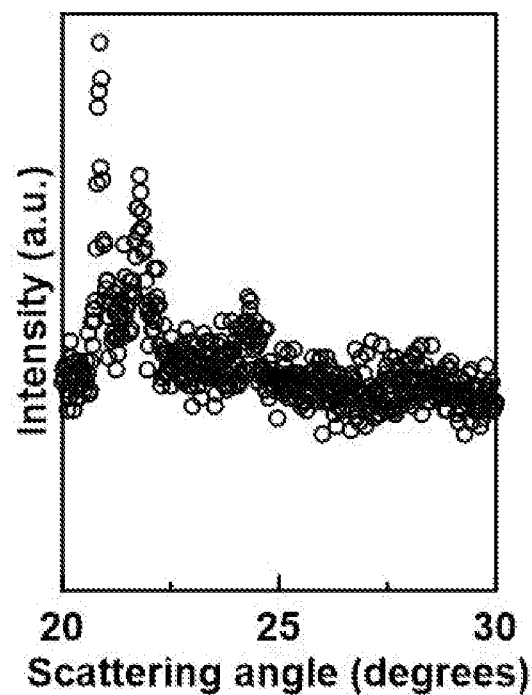
FIG. 12b shows the expanded XRD pattern of the CE-LiNMC-1 lithium transition metal oxide particulate of comparative Example 10 between 20° and 30°.
Figure 12C:
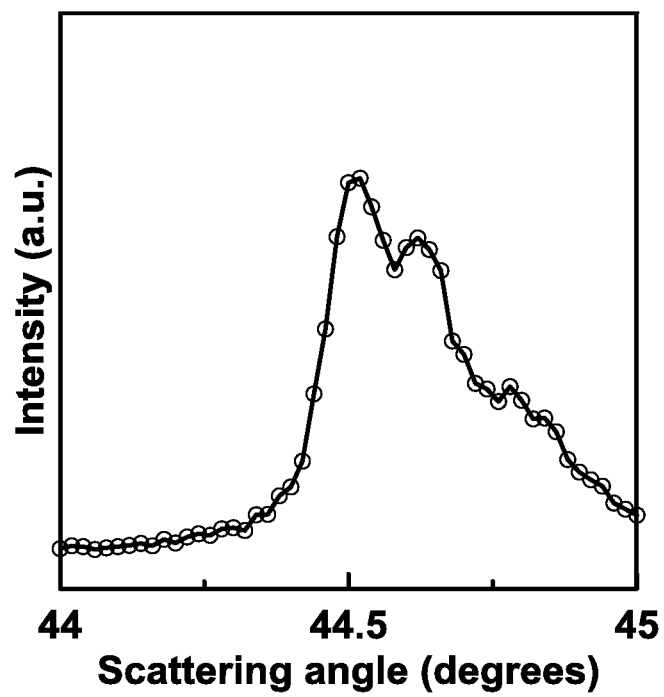
FIG. 12c shows the Cu $K_{\alpha 1}/K_{\alpha 2}$ splitting of the (104) peak of the CE-LiNMC-1 lithium transition metal oxide particulate of comparative Example 10.
Figure 12D:
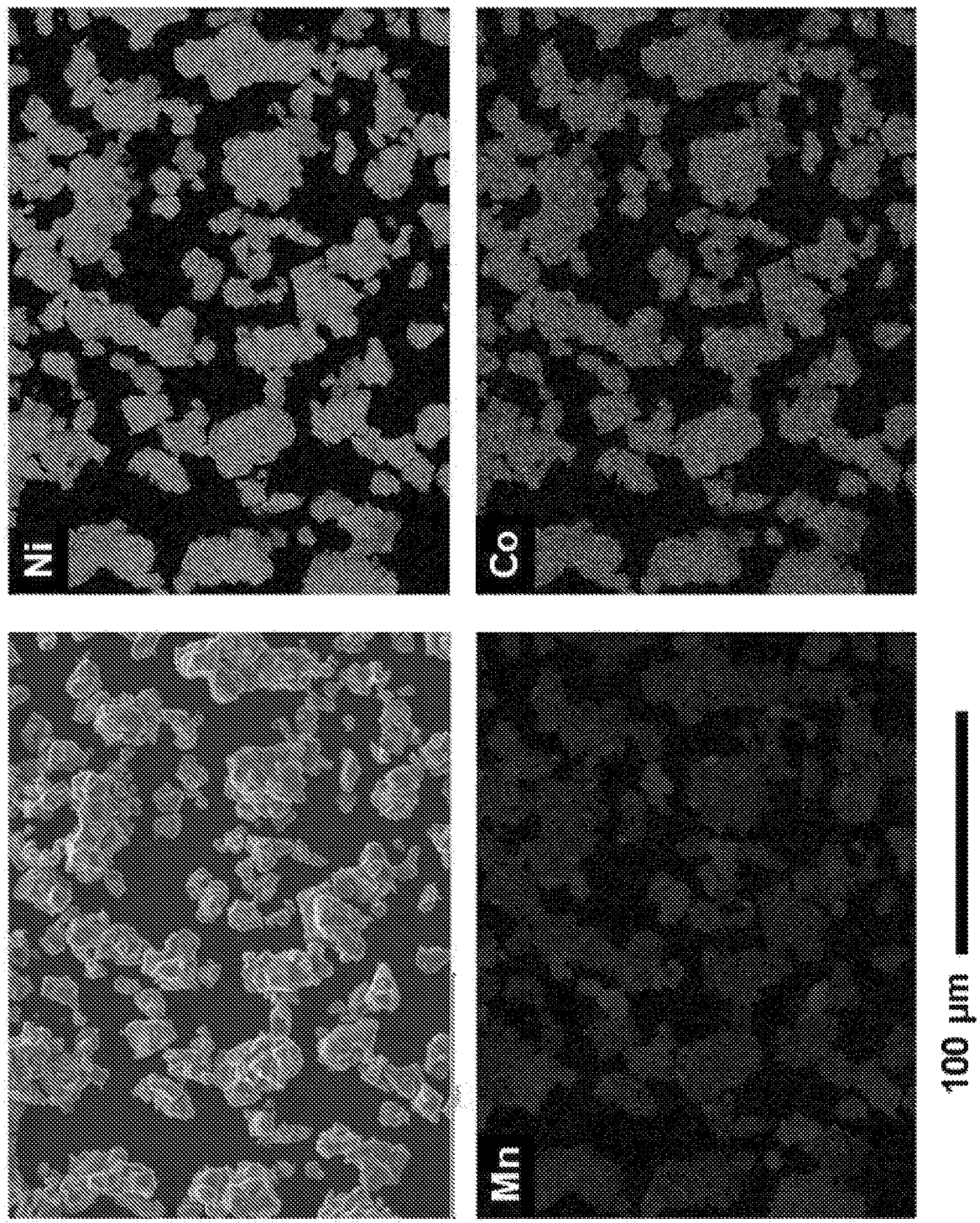
FIG. 12d shows EDS mapping of the CE-LiNMC-1 lithium transition metal oxide particulate of comparative Example 10.

FIG. 12a shows an XRD pattern of CE-LiNMC-1. CE-LiNMC-1 is not phase pure, as multiple peaks can be seen in the expanded XRD patterns shown in FIG. 12b and FIG. 12c. Phase separation occurs for this sample. FIG. 12d shows an EDS mapping of CE-LiNMC-1. It can be seen that while Ni and Co distribute homogeneously across the sample, Mn does not distribute evenly. These traits are not desirable for commercial "NMC".

The preceding examples demonstrate that high quality, high performance single crystal "NMC" lithium transition metal oxide particulate for electrode materials in lithium batteries can be prepared by a method of the invention. Such lithium transition metal oxide particulate was prepared simply by dry impact milling a starting mixture comprising suitable transition metal powders and then heating a final mixture comprising this precursor particulate and a suitable Li compound. Hand grinding a similar starting mixture however did not however result in an acceptable "NMC" lithium transition metal oxide particulate.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. A precursor particulate consisting essentially of a single rock-salt phase having the formula $(Ni_nMn_mCo_c)_{1-a}A_aLi_bO_{1+b}$ wherein:

A is a metal dopant; and n is a positive number and m, c and a are positive numbers or zero, wherein:

$n+m+c=1$;

$n \geq 0.05$;

$m \geq 0$;

$c \geq 0$;

$0 \leq a \leq 0.05$; and $m+c+a \geq 0.05$;

wherein:
 the average grain size of the precursor particulate is less than 50 nm; and
 the average particle size of the precursor particulate is greater than 100 nm.

2. The precursor particulate of claim 1 wherein A is Mg, Al, Ti, Zr, W, Zn, Mo, K, Na, Si or Ta or combinations thereof.

3. The precursor particulate of claim 1 wherein c>0.05.

4. The precursor particulate of claim 1 wherein m>0.05.

5. The precursor particulate of claim 1 wherein m+c>0.05.

6. The precursor particulate of claim 1 having a lattice constant greater than 4.18 Å.

7. The precursor particulate of claim 1 wherein at least 95 atomic % of all the precursor metals in the precursor particulate have a stable 2+ oxidation state.

8. The precursor particulate of claim 7 wherein essentially all the precursor metals in the precursor particulate are present in their 2+ oxidation state.

9. The precursor particulate of claim 1 wherein average particle size of the precursor particulate is greater than or equal to 1 μm.

10. The precursor particulate of claim 1 comprising secondary particles of the precursor particulate.

11. A method of making the precursor particulate of claim 1 comprising:
obtaining an amount of a compound of Ni;
preparing a starting mixture comprising the amount of the compound of Ni; and
dry impact milling the starting mixture sufficiently to produce the single rock-salt phase precursor particulate with an average grain size that is less than 50 nm and with an average particle size greater than 100 nm.

12. The method of claim 11 wherein the starting mixture consists essentially of compounds selected from the group consisting of oxides, hydroxides, carbonates and mixtures thereof.

13. The method of claim 11 wherein greater than 50 atomic % of all the precursor metals in the starting mixture are in a 2+ oxidation state.

14. The method of claim 11 wherein all of the precursor metals in the starting mixture are in a 2+ oxidation state.

15. The method of claim 11 wherein the average oxidation state of the precursor metals in the starting mixture is in the range from +1.5 to +2.5.

16. The method of claim 11 wherein the average oxidation state of the precursor metals in the starting mixture is $2^+$.

17. The method of claim 11 wherein starting mixture consists of metal monoxides.

18. The method of claim 11 comprising:
obtaining an amount of a source of Co selected from the group consisting essentially of an oxide of Co, a hydroxide of Co, a carbonate of Co, and mixtures thereof, and
preparing the starting mixture comprising the amounts of the compound of Ni and the compound of Co together.

19. The method of claim 11 comprising:
obtaining an amount of a source of Mn selected from the group consisting essentially of an oxide of Mn, a hydroxide of Mn, a carbonate of Mn, and mixtures thereof, and
preparing the starting mixture comprising the amounts of the compound of Ni and the compound of Mn together.

20. The method of claim 11 comprising:
obtaining an amount of a source of Mn selected from the group consisting essentially of an oxide of Mn, a hydroxide of Mn, a carbonate of Mn, and mixtures thereof,
obtaining an amount of a source of Co selected from the group consisting essentially of an oxide of Co, a hydroxide of Co, a carbonate of Co, and mixtures thereof, and
preparing the starting mixture comprising the amounts of the compound of Ni, the compound of Co, and the compound of Mn together.

21. The method of claim 20 wherein the compound of Ni is NiO, the compound of Mn is MnO, and the compound of Co is CoO.

22. The method of claim 11 wherein the ratio of the total number of moles of Ni in the starting mixture to the total number of moles of Mn in the starting mixture to the total number of moles of optional Co in the starting mixture to the total number of moles of optional A to the total number of moles of optional Li in the starting mixture is equal to n:m:c:a:b.

23. The method of claim 11 wherein the dry impact milling is conducted using non-ferrous milling apparatus.

24. The method of claim 11 wherein the dry impact milling comprises ball milling.

25. The method of claim 24 wherein the ball milling is conducted using a non-ferrous mill and non-ferrous milling media.

26. A method of making a lithium transition metal oxide particulate with an O3 crystal structure and having the formula $Li_{1+x}[(Ni_nMn_mCo_c)_{1-a}A_a]_{1-x}O_2$ wherein:
A is a metal dopant; and
x, n, m, c and a are numbers wherein:

$-0.03 \leq x \leq 0.06;$ $n+m+c=1;$ $n \geq 0.05;$ $m \geq 0;$ $c \geq 0;$ $0 \leq a \leq 0.05;$ and $m+c+a \geq 0.05;$ the method comprising:
obtaining an amount of the precursor particulate of claim 1;
preparing a final mixture comprising the amount of the precursor particulate and an amount of a Li compound selected from the group consisting essentially of Li oxide, Li hydroxide, Li carbonate and mixtures thereof; and
heating the final mixture to react the Li compound with the precursor particulate and thereby produce the lithium transition metal oxide particulate with the O3 crystal structure.

27. The method of claim 26 wherein the Li compound is $Li_2CO_3$.

28. The method of claim 26 wherein the step of heating the final mixture comprises heating in air.

29. The method of claim 28 wherein the step of heating the final mixture comprises heating in oxygen after heating in air.

30. The method of claim 26 wherein the step of heating the final mixture is conducted at greater than 600° C. for greater than 6 hours.

31. The method of claim 26 wherein an excess of Li compound is employed in the final mixture and the method additionally comprises washing away excess unreacted Li compound from the produced lithium transition metal oxide particulate.

32. The method of claim 26 wherein the average particle size of the lithium transition metal oxide particulate produced is greater than 1 μm.

33. The method of claim 26 wherein the average facet size of the lithium transition metal oxide particulate produced is greater than 1 μm.

34. The method of claim 26 wherein the average facet size of the lithium transition metal oxide particulate produced is greater than 20% of the average particle size.

35. The method of claim 26 wherein the lithium transition metal oxide particulate with the O3 crystal structure has a c/a ratio of greater than 4.95.

36. A method of making a lithium transition metal oxide particulate with an O3 crystal structure and having the formula $Li_{1+x}[(Ni_nMn_mCo_c)_{1-a}A_a]_{1-x}O_2$ wherein:

A is a metal dopant; and x, n, m, c and a are numbers wherein:

$-0.03 \leq x \leq 0.06$;

$n+m+c=1$;

$n \geq 0.05$;

$m \geq 0$;

$c \geq 0$;

$0 \leq a \leq 0.05$; and $m+c+a \geq 0.05$;

the method comprising:
preparing a precursor particulate according to the method of claim 9;
preparing a final mixture comprising an amount of the precursor particulate and an amount of a Li compound selected from the group consisting essentially of Li oxide, Li hydroxide, Li carbonate and mixtures thereof; and
heating the final mixture to react the Li compound with the precursor particulate and thereby produce the lithium transition metal oxide particulate with the O3 crystal structure.

37. A method of making a rechargeable battery comprising an electrode comprising lithium transition metal oxide particulate, the method comprising preparing the lithium transition metal oxide particulate according to the method of claim 26.

* * * * *

UNITED STATES PATENT AND TRADEMARK OFFICE
CERTIFICATE OF CORRECTION

PATENT NO. : 12,378,132 B2
APPLICATION NO. : 17/638666
DATED : August 5, 2025
INVENTOR(S) : Lituo Zheng et al.

It is certified that error appears in the above-identified patent and that said Letters Patent is hereby corrected as shown below:

On the Title Page

Page 2, Column 2 (item (56) Other Publications), Line 10, delete ""Preparatio of" and insert -- "Preparation of --.

Page 3, Column 2 (item (56) Other Publications), Line 10, delete "high perfoamnce lithium" and insert -- high performance lithium --.

Page 3, Column 2 (item (56) Other Publications), Line 15, delete ""High perforamnce of" and insert -- "High performance of --.

Page 3, Column 2 (item (56) Other Publications), Line 21, delete "CoO Nancrystals with" and insert -- CoO Nanocrystals with --.

Page 3, Column 2 (item (56) Other Publications), Line 26, delete "on Kinestics and" and insert -- on Kinetics and --.

In the Specification

Column 2, Line 51, delete "$Ni(NO_3)_2 \cdot 4H_2O$," and insert -- $Ni(NO_3)_2 \cdot 6H_2O$, --.

Column 4, Line 59, delete "$Li_bO_{1+b}$, where" and insert -- $Li_bO_{1+b+\delta}$, where --.

Column 4, Lines 61-62, delete "$n \geq 0.05; m \geq 0; c \geq 0; 0 \leq a \leq 0.05; \leq b \leq 0.05; m+c+a \geq 0.05;$ and $-0.02 < \delta < 0.02$." and insert -- $n \geq 0.05; m \geq 0; c \geq 0; 0 \leq a \leq 0.05; 0 \leq b \leq 0.05; m+c+a \geq 0.05;$ and $-0.02 \leq \delta \leq 0.02$. --.

Column 5, Line 2, delete "$m \geq 0 \ c \geq 0;$" and insert -- $m \geq 0; c \geq 0;$ --.

Signed and Sealed this
Seventh Day of October, 2025

John A. Squires
*Director of the United States Patent and Trademark Office*

CERTIFICATE OF CORRECTION (continued)
U.S. Pat. No. 12,378,132 B2

Column 6, Line 26 (approx.), delete "0.05;and" and insert -- 0.05; and --.

Column 15, Line 3 (approx.), delete "0.05;and" and insert -- 0.05; and --.

Column 15, Line 5 (approx.), delete "0.05;" and insert -- 0.05. --.

Column 19, Line 17, delete "not $2^+$" and insert -- not 2+ --.

Column 19, Line 30, delete "of $2^+$. 56%" and insert -- of 2+. 56% --.

Column 19, Line 67, delete "between 20°and 30°" and insert -- between 20° and 30° --.

Column 20, Line 4, delete "is 0.110, which" and insert -- is 0.11°, which --.

Column 20, Line 12, delete "~150 mA/g" and insert -- ~150 mAh/g --.

Column 20, Line 50, delete "~160 mA/g" and insert -- ~160 mAh/g --.

Column 21, Line 23, delete "~160 mA/g" and insert -- ~160 mAh/g --.

Column 21, Line 51, delete "between 200 and 300 shown" and insert -- between 20° and 30° shown --.

Column 22, Line 9, delete "~170 mA/g" and insert -- ~170 mAh/g --.

Column 22, Line 47, delete "~160 mA/g" and insert -- ~160 mAh/g --.

In the Claims

Column 24, Claim 1, Line 43 (approx.), delete "0.05;and" and insert -- 0.05; and --.

Column 25, Claim 16, Line 26, delete "is $2^+$." and insert -- is 2+. --.

Column 25, Claim 18, Line 34 (approx.), delete "mixtures thereof, and" and insert -- mixtures thereof; and --.

Column 25, Claim 19, Line 41 (approx.), delete "mixtures thereof, and" and insert -- mixtures thereof; and --.

Column 25, Claim 20, Line 48, delete "mixtures thereof," and insert -- mixtures thereof; --.

Column 25, Claim 20, Line 52, delete "mixtures thereof, and" and insert -- mixtures thereof; and --.

Column 26, Claim 26, Line 25 (approx.), delete "0.05;and" and insert -- 0.05; and --.

Column 27, Claim 36, Line 16 (approx.), delete "0.05;and" and insert -- 0.05; and --.